United States Patent
Campbell et al.

(10) Patent No.: US 7,920,943 B2
(45) Date of Patent: Apr. 5, 2011

(54) PRECISION APPROACH GUIDANCE SYSTEM AND ASSOCIATED METHOD

(75) Inventors: Jacob L. Campbell, Dayton, OH (US); Frank van Graas, Lancaster, OH (US); Maarten Uilt de Haag, Athens, OH (US)

(73) Assignee: Ohio University, Athens, OH (US)

( * ) Notice: Subject to any disclaimer, the term of this patent is extended or adjusted under 35 U.S.C. 154(b) by 794 days.

(21) Appl. No.: 11/814,509

(22) PCT Filed: Jan. 24, 2006

(86) PCT No.: PCT/US2006/002329
§ 371 (c)(1),
(2), (4) Date: Jul. 23, 2007

(87) PCT Pub. No.: WO2007/067192
PCT Pub. Date: Jun. 14, 2007

(65) Prior Publication Data
US 2008/0119970 A1    May 22, 2008

Related U.S. Application Data

(60) Provisional application No. 60/646,362, filed on Jan. 24, 2005.

(51) Int. Cl.
*G06F 19/00* (2006.01)
(52) U.S. Cl. .............. 701/9; 701/16; 244/75.1; 340/945
(58) Field of Classification Search ................ 701/9, 16; 244/75.1; 340/945
See application file for complete search history.

(56) References Cited

U.S. PATENT DOCUMENTS

| 4,792,904 | A | 12/1988 | Reinagel et al. |
| 4,812,995 | A | 3/1989 | Girgis et al. |
| 4,825,374 | A | 4/1989 | King et al. |
| 5,216,611 | A | 6/1993 | McElreath |
| 6,484,072 | B1 * | 11/2002 | Anderson et al. ............. 701/9 |
| 6,980,892 | B1 * | 12/2005 | Chen et al. .................. 701/9 |
| 7,379,796 | B2 * | 5/2008 | Walsdorf et al. .............. 701/9 |
| 2002/0147544 | A1 | 10/2002 | Nicosia et al. |
| 2004/0111192 | A1 * | 6/2004 | Naimer et al. ................ 701/9 |
| 2004/0119638 | A1 * | 6/2004 | Fagan et al. ............ 342/357.03 |
| 2006/0149473 | A1 * | 7/2006 | Krings ..................... 701/221 |

OTHER PUBLICATIONS

Campbell et al., Availability aspects of a terrain database integrity monitor, Proceedings—ION 57th Annual Meeting/CIGTF 20th Biennial Guidance and Test Symposium, Albuquerque, NM, pp. 238-246 (Jun. 11-13, 2001).

(Continued)

*Primary Examiner* — Mark Hellner
(74) *Attorney, Agent, or Firm* — Calfee, Halter & Griswold LLP

(57) ABSTRACT

A precision approach guidance system that provides flying craft guidance information during a precision approach to a landing site and methods associated therewith are provided. In one embodiment, the system includes: an inertial navigation system, an onboard ranging sensor, a terrain database storing previously identified position-referenced terrain information associated with the landing site, and a position determining process. The position determining process repetitively determines a corrected position of the flying craft during the precision approach based at least in part on attitude and velocity information from an inertial navigation system, current position-referenced terrain information based on measurements from an onboard ranging sensor, and previously identified position-referenced terrain information from the terrain database.

28 Claims, 21 Drawing Sheets

OTHER PUBLICATIONS

Campbell et al., DC-3 Flying Laboratory—Navigation Sensor and Remote Sensing Flight Test Results, Proceedings—ION GNSS 17th International Meeting of the Satellite Division, Long Beach, CA, pp. 285-295 (Sep. 21-24, 2004).

Campbell et al., Flash-LADAR Inertial Navigator Aiding, ION/IEEE Plans 2006, Coronado/ San Diego, CA, pp. 677-683 (Apr. 25-27, 2006).

Campbell et al., Terrain Reference Precision Approach Guidance (presentation), 2005 National Technical Meeting (NTM) of the Institute of Navigation (ION), San Diego, CA, 15 pages (Jan. 24-26, 2005).

Campbell et al., The Application of LiDAR to Synthetic Vision System Integrity, Proceedings—22nd Digital Avionics Systems Conference (DASC), Indianapolis, IN, pp. 9.C.2-1-2.7 (Oct. 12-16, 2003).

Huising et al., Errors and accuracy estimates of laser data acquired by various laser scanning systems for topographic applications, ISPRS Journal of Photogrammetry & Remote Sensing, vol. 53, pp. 245-261 (1998).

Uijt de Haag et al., A 3-Dimensional Display of Traffic and Terrain Information for the Small Aircraft Transportation System, Proceedings—ION GPS 2002, Portland, OR, pp. 1030-1037 (Sep. 24-27, 2002).

Uijt de Haag et al., A Terrain Database Integrity Monitor for Synthetic Vision Systems, Proceedings—19th Digital Avionics Systems Conference (DASC), Philadelphia, PA, pp. 2.C.3-1-3-8 (Oct. 7-13, 2000).

Uijt de Haag et al., Flight Test Evaluation and Comparison of Various Terrain Referenced Navigation Techniques for En-route and Approach Aircraft Guidance, ION/IEEE Plans 2006, Coronado/ San Diego, CA, pp. 440-449 (Apr. 25-27, 2006).

Uijt de Haag et al., Terrain Database Integrity Monitoring for Synthetic Vision Systems, IEEE Transactions on Aerospace and Electronic Systems, vol. 41, No. 2, pp. 386-406 (Apr. 2005).

Vadlamani et al., A 3-D Spatial Integrity Monitor for Terrain Databases, Proceedings—23rd Digital Avionics Systems Conference (DASC), Salt Lake City, UT, pp. 4.C.2-1-2-13 (Oct. 24-28, 2004).

Vadlamani et al., Application of Spectral Estimation Techniques to Terrain Database Integrity Monitors and Terrain Navigation Systems, Proceedings—ION GPS/GNSS 2003, Portland, OR, pp. 2389-2398 (Sep. 9-12, 2003).

Vadlamani et al., Improved Downward-Looking Terrain DatabaseIntegrity Monitor and Terrain Navigation, 2004 IEEE Aerospace Conference Proceedings, Big Sky, MT, pp. 1594-1607 (Mar. 6-13, 2004).

Vadlamani et al., Improving the Detection Capability of Spatial Failure Modes using Downward-looking Sensors in Terrain Database Integrity Monitors, Proceedings—22nd Digital Avionics Systems Conference (DASC), Indianapolis, IN, pp. 9.C.5-1-5-12 (Oct. 12-16, 2003.

Vaughn et al., Georeferencing of Airborne Laser Altimeter Measurements, International Journal of Remote Sensing, vol. 17, No. 11, pp. 2185-2200 (1996).

Wehr et al., Airborne laser scanning—an introduction and overview, ISPRS Journal of Photogrammetry & Remote Sensing, vol. 54, pp. 68-82 (1999).

Young et al., An X-band Radar Terrain Feature Detection Method for Low-altitude SVS Operations and Calibration using LIDAR, Proceedings of SPIE— vol. 5424, SPIE 18th Annual Symposium on Aerospace/Defense Sensing, Simulation, ands Controls, Orlando, FL, 15 pages (Apr. 12-16, 2004).

Brown et al., Introduction to Random Signals and Applied Kalman Filtering, John Wiley & Sons, Inc., New York, NY, 2nd edition, 1992, pp. 192-197, 253-259, 265-267, 366-371, 409-455, and 470-473.

Campbell et al., LIDAR Increase Aircraft Precision, Geospatial Solutions, Nov. 2005.

Campbell et al., Light Detection and Ranging-Based Terrain Navigation—A Concept Exploration, Proceedings of the Institute of Navigation (ION) Global Positioning System (GPS)/Global Navigation Satellite System (GNSS) 2003, Portland, OR, Sep. 10-12, 2003.

Campbell et al., Terrain Reference Navigation using Airborne LAser SCAnner (ALASCA)—Preliminary Flight Test Results, Proceedings of the Institute of Navigation (ION) 60th Annual Meeting, Dayton, OH, Jun. 7-9, 2004.

Campbell et al., Terrain Reference Precision Approach Guidance, Proceedings of the 2005 National Technical Meeting of the Institute of Navigation (ION), San Diego, CA, Jan. 24-26, 2005, pp. 643-653.

Kopp, Cruise Missiles—Parts I and II, Australian Aviation, Sep./Nov. 1985, last updated Oct. 24, 2005, http://www.auairpower.net/TE-Cruise-Missiles-1985.html printed on Jan. 19, 2006, 46 pgs.

Uijt de Haag et al., Integration of a Synthetic Vision System with Airborne Laser Range Scanner-based Terrain Referenced Navigation for Precision Approach Guidance, PowerPoint presentation at SPIE Defense & Security Symposium, Mar. 28-Apr. 1, 2005.

Uijt de Haag et al., Integration of a Synthetic Vision System with Airborne Laser Range Scanner-based Terrain Referenced Navigation for Precision Approach Guidance, Proceedings of the International Society for Optical Engineering (SPIE), vol. 5802, May 2005, pp. 71-82.

Examination Report issued Jun. 18, 2009 from corresponding UK Patent Application Ser. No. GB0714438.9, 3 pgs.

International Application No. PCT/US06/02329, International Search Report, mailed Nov. 7, 2007 (4 pages).

International Application No. PCT/US06/02329, Written Opinion of the International Searching Authority, mailed Nov. 7, 2007 (3 pages).

Response to Examination Report from UK Application No. 0714438.9 dated Oct. 16, 2009.

Examination Report from UK Application No. 0714438.9 dated Nov. 3, 2009.

Response to Examination Report from UK Application No. 0714438.9 dated Mar. 3, 2010.

* cited by examiner

PRECISION APPROACH GUIDANCE SYSTEM AND ASSOCIATED METHOD

This application claims priority to, and any benefit associated with, U.S. Provisional Pat. App. Ser. No. 60/646,362, filed Jan. 24, 2005, the contents of which are fully incorporated herein by reference.

FIELD OF THE INVENTION

The invention generally relates to a precision approach guidance system for a flying craft and a method of providing guidance information during a precision approach by the flying craft to a landing site. The system and method may be used in various types of aircraft, spacecraft, and other types of flying craft, including private, commercial, military, manned, and unmanned craft.

BACKGROUND

Certain aircraft precision approach guidance systems, for example, require accurate positioning relative to the runway with a high level of integrity. Precision approach guidance systems in use today typically require ground-based electronic navigation components with at least one installation at each airport, and in many cases multiple installations to service approaches to all qualifying runways. A guidance system that provides precision guidance to an aircraft without the use of ground-based electronic navigation components is needed. Similar needs exist for spacecraft and other types of flying craft.

SUMMARY

In one aspect, a method of providing flying craft guidance information during a precision approach to a landing site is provided. In one exemplary embodiment, the method includes: providing a terrain database storing previously identified position-referenced terrain information associated with the landing site and repetitively determining a corrected position of the flying craft during the precision approach based at least in part on attitude and velocity information from an inertial navigation system, current position-referenced terrain information based on measurements from an onboard ranging sensor, and previously identified position-referenced terrain information from the terrain database.

In another aspect, a precision approach guidance system that provides flying craft guidance information during a precision approach to a landing site is provided. In one exemplary embodiment, the system includes: an inertial navigation system, an onboard ranging sensor, a terrain database storing previously identified position-referenced terrain information associated with the landing site, and a position determining process in communication with the inertial navigation system, onboard ranging sensor, and terrain database. The exemplary position determining process may repetitively determine a corrected position of the flying craft during the precision approach based at least in part on attitude and velocity information from an inertial navigation system, current position-referenced terrain information based on measurements from an onboard ranging sensor, and previously identified position-referenced terrain information from the terrain database.

In another exemplary embodiment, the precision approach guidance system includes an inertial navigation system, an onboard ranging sensor, a terrain database storing previously identified position-referenced terrain information associated with the landing site, and first means for repetitively determining a corrected position of the flying craft during the precision approach based at least in part on attitude and velocity information from an inertial navigation system, current position-referenced terrain information based on measurements from an onboard ranging sensor, and previously identified position-referenced terrain information from the terrain database.

DETAILED DESCRIPTION

Figure 1:
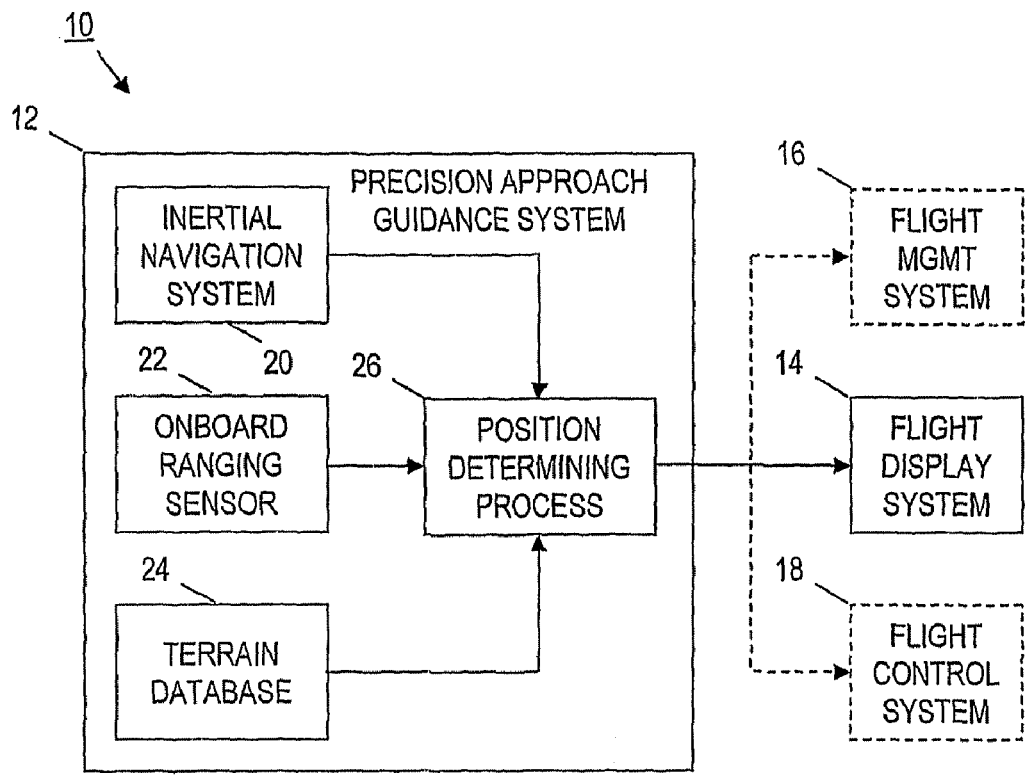
FIG. 1 is a block diagram of an exemplary embodiment of a flying craft with an exemplary embodiment of a precision approach guidance system.

The list below identifies certain acronyms used herein and the corresponding long form associated with the acronym.
2-D Two-Dimensional
3-D Three-Dimensional
AGL Above Ground Level
ALASCA Airborne Laser SCAnner
ALS Airborne Laser Scanner
ARINC Aeronautical Radio Incorporated
ASCII American Standard Code for Interface and Interchange
CAT Category
DCD Data Collection and Distribution
DH Decision Height
EGNOS European Geostationary Navigation Overlay System
ENU East North Up
FAA Federal Aviation Administration
GNU GNU's Not Unix (General Public Software License)
GPS Global Positioning System
HDD Heads-Down Display
ILS Instrument Landing System
IMU Inertial Measurement Unit
INS Inertial Navigation System
IRU Inertial Reference Unit
LAAS Local Area Augmentation System
LCD Liquid Crystal Display
LIDAR LIght Detection And Ranging
LMS Laser Measurement System
LOS Line Of Sight
LSO Laser Scanner Optics
MSAS Multi-Functional Satellite Augmentation System
MSE Mean of the Square Error
MSL Mean Sea Level
MTT Mode Transition Threshold
NAV Navigation
PC Personal Computer
PPS Pulse Per Second
PRF Pulse Repetition Frequency
QNX Quick Unix
RLG Ring Laser Gyro
RVR Runway Visual Range
SBAS Satellite-Based Augmentation System
SSE Sum Squared Error
SV Space Vehicle
TCP/IP Transmission Control Protocol/Internet Protocol
UDP User Datagram Protocol
UTM Universal Trans-Mercator
WAAS Wide Area Augmentation System
WGS 84 World Geodetic System 1984

The following paragraphs provide definitions of exemplary terms used herein. Both singular and plural forms of these terms fall within each meaning.

"Attitude information" as used herein includes, but is not limited to, the position of an aircraft or spacecraft determined by the relationship between its axes and a reference datum (e.g., horizon or a particular star). Attitude information may include pitch, roll, and yaw (i.e., heading) angular measurements. Pitch refers to rotation about a lateral or transverse axis. Roll refers to rotation about a longitudinal axis. Yaw refers to rotation about a normal axis (i.e., an axis perpendicular to the pitch and roll axes).

"Flying craft" as used herein includes, but is not limited to, aircraft, spacecraft, and other flying craft, including manned and unmanned craft. Aircraft includes aerodynes and aerostats. Aerodynes include fixed-wing aircraft, rotary-wing aircraft, vertical takeoff and landing aircraft, short takeoff and landing aircraft, and other types of aircraft. Aerostats include hot air balloons, gas balloons, blimps, rigid airships, and other types of aerostats. Spacecraft includes orbiters, shuttles, landers, explorers, probes, and other types of spacecraft.

"Global positioning system" as used herein includes, but is not limited to, a radio navigation system with a space segment and ground stations, such as the U.S. NAVSTAR GPS, Russia's GLONASS, Europe's Galileo, or any other GPS, that can be used to determine a corresponding GPS receiver's location almost anywhere on the Earth or in Earth orbit.

"Guidance information" as used herein includes, but is not limited to, horizontal and vertical information to guide a flying craft to a landing site along a precision approach path.

"Inertial navigation system" as used herein includes, but is not limited to, an onboard system that provides attitude and velocity information for a flying craft by measuring accelerations and rotations applied to the flying craft's inertial frame using an IMU. A typical IMU includes a combination of gyroscopes and accelerometers to sense the accelerations and rotations. Position information based on IMU measurements suffers from accumulated error which leads to increasing drift between the position information and the actual position.

"Landing site" as used herein includes, but is not limited to, an airport runway, landing field, landing strip, airstrip, landing area, landing zone, landing point, helipad, heliport, and any specially prepared or selected surface of land, water, or artificial structure designated or used for landing of flying craft.

"Laser scanner" as used herein includes, but is not limited to, a distance range measurement instrument using time-of-flight measurement of laser pulses and reflections with a scanning mechanism to profile an object surface. The scanning mechanism may permit adjustment of scanning range, rate, and step angle.

"Position-referenced terrain information" as used herein includes, but is not limited to, a set of points defining a natural or artificial 3-D surface of the Earth or a celestial body in terms of a 3-D coordinate system referenced to the Earth or another celestial body. For example, the U.S. NAVSTAR GPS provides position information in terms of latitude, longitude, and elevation in accordance with WGS 84 which is a 3-D coordinate system referenced to the Earth.

"Precision approach" as used herein includes, but is not limited to, an approach in which electronic glide slope (i.e., azimuth or vertical) and glide path (i.e., lateral or course) information is provided for landing a flying craft at a landing site using instruments.

"Radio navigation system" as used herein includes, but is not limited to, a navigation system with a network of components at known positions relative to the Earth or another celestial body and transmitting radio frequency signals that can be used by a corresponding radio receiver to determine its position in reference to the Earth or another celestial body. The radio navigation system may include additional components for control of the components at known positions. GPS and WAAS navigation systems are examples of radio navigation systems with components at known positions relative to the Earth that transmit signals that can be used by a corresponding GPS or WAAS receiver to determine its position in reference to the Earth.

"Radio receiver" as used herein includes, but is not limited to, is a receiver adapted to receive radio frequency signals from a radio navigation system and determine its position in reference to the Earth or another celestial body from the received signals. GPS and WAAS receivers are examples of radio receivers that can receive signals from corresponding GPS and WAAS navigation systems and determine their respective position relative to the Earth.

"Ranging sensor" as used herein includes, but is not limited to, a measurement instrument using time-of-flight measurement of pulses and reflections to measure a range distance to an object surface. A ranging sensor may include a scanning mechanism which may permit adjustment of scanning range, rate, and step angle. A laser scanner is an example of a ranging sensor.

"Wide area augmentation system" as used herein includes, but is not limited to, a radio navigation system with a space segment and ground stations, such as the U.S. Federal Aviation Administration (FAA) WAAS, European Geostationary Navigation Overlay System (EGNOS), Japanese Multi-Functional Satellite Augmentation System (MSAS), or any other satellite-based augmentation system (SBAS), that can be used to improve the precision and accuracy of GPS signals.

Generally, a terrain-referenced precision approach guidance system is envisioned that provides flying craft guidance information during a precision approach to a landing site without the use of ground-based electronic navigation components installed at the landing site, areas surrounding the landing, and/or other ground locations associated with the landing site. In one embodiment, the system includes an inertial navigation system (INS) to estimate flying craft position, a ranging sensor to identify current terrain information associated with the flying craft's actual position, a terrain database storing previously identified terrain information associated with the landing site, and processes to estimate position error using the current and previously identified terrain information and provide the desired guidance information as a corrected position with horizontal and vertical position components.

With reference to FIG. 1, an exemplary embodiment of a flying craft 10 may include a precision approach guidance system 12 in communication with a flight display system 14 to provide guidance information to, for example, a pilot via the flight display system 14 during a precision approach to a landing site. In other embodiments, the flying craft 10 also includes various combinations of the flight display system 14, a flight management system 16, and a flight control system 18. The guidance information may be provided to any of the flight display system 14, flight management system 16, flight control system 18, or combinations thereof.

An exemplary embodiment of the precision approach guidance system 12 may include an INS 20, an onboard ranging sensor 22, a terrain database 24, and a position determining process 26 in communication with the INS 20, onboard ranging sensor 22, and terrain database 24. The terrain database 24 stores previously identified position-referenced terrain information associated with the landing site. The position determining process 26 repetitively determines a corrected position of the flying craft during the precision approach. The corrected position is based at least in part on attitude and velocity information from the INS 20, current position-referenced terrain information based on measurements from the onboard ranging sensor 22, and previously identified position-referenced terrain information from the terrain database 24.

Figure 2:
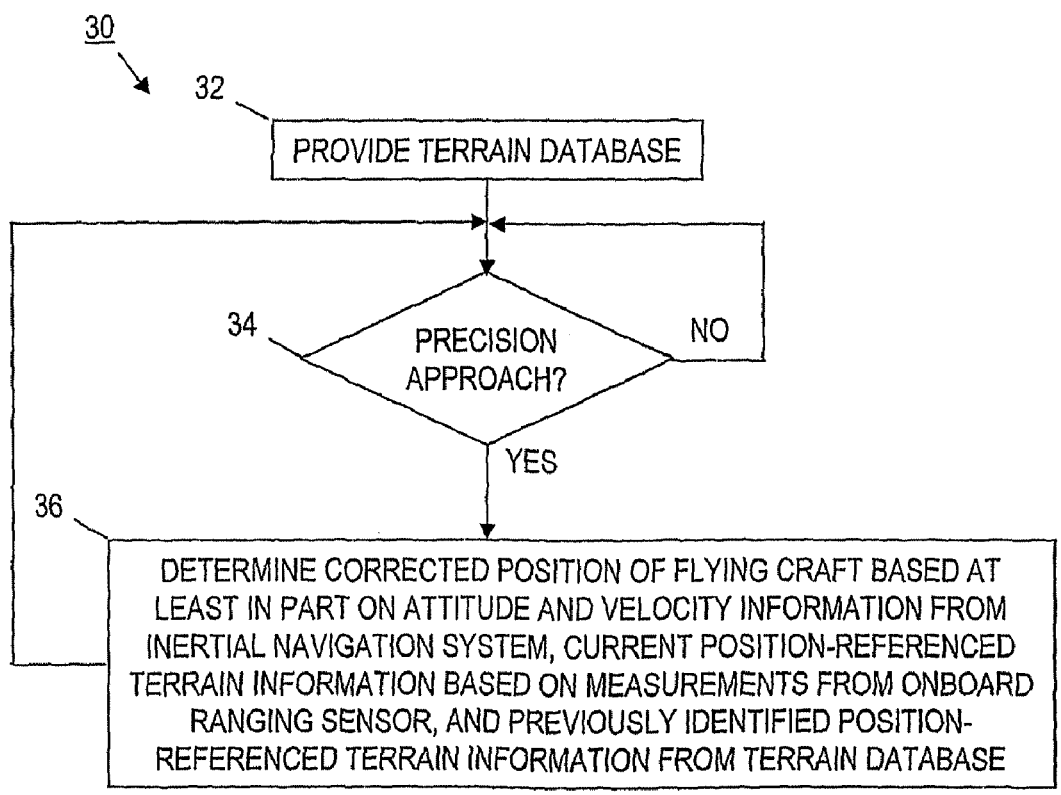
FIG. 2 is a flow chart of an exemplary embodiment of a process for providing flying craft guidance information during a precision approach to a landing site.

With reference to FIG. 2, an exemplary embodiment of a process 30 for providing flying craft guidance information during a precision approach to a landing site begins at 32 where a terrain database is provided. The terrain database stores previously identified position-referenced terrain information associated with the landing site. At 34, the process determines if the flying craft is in a precision approach. During a precision approach, a corrected position of the flying craft is determined until the precision approach is either completed, aborted, or ended in some other manner (36). The corrected position may be based at least in part on attitude and velocity information from an INS, current position-referenced terrain information based on measurements from an onboard ranging sensor, and previously identified position-referenced terrain information from the terrain database. After the corrected position is determined, the process returns to 34. At 34, if the flying craft is not in a precision approach, the process waits for the flying craft to begin a precision approach.

Figure 3:
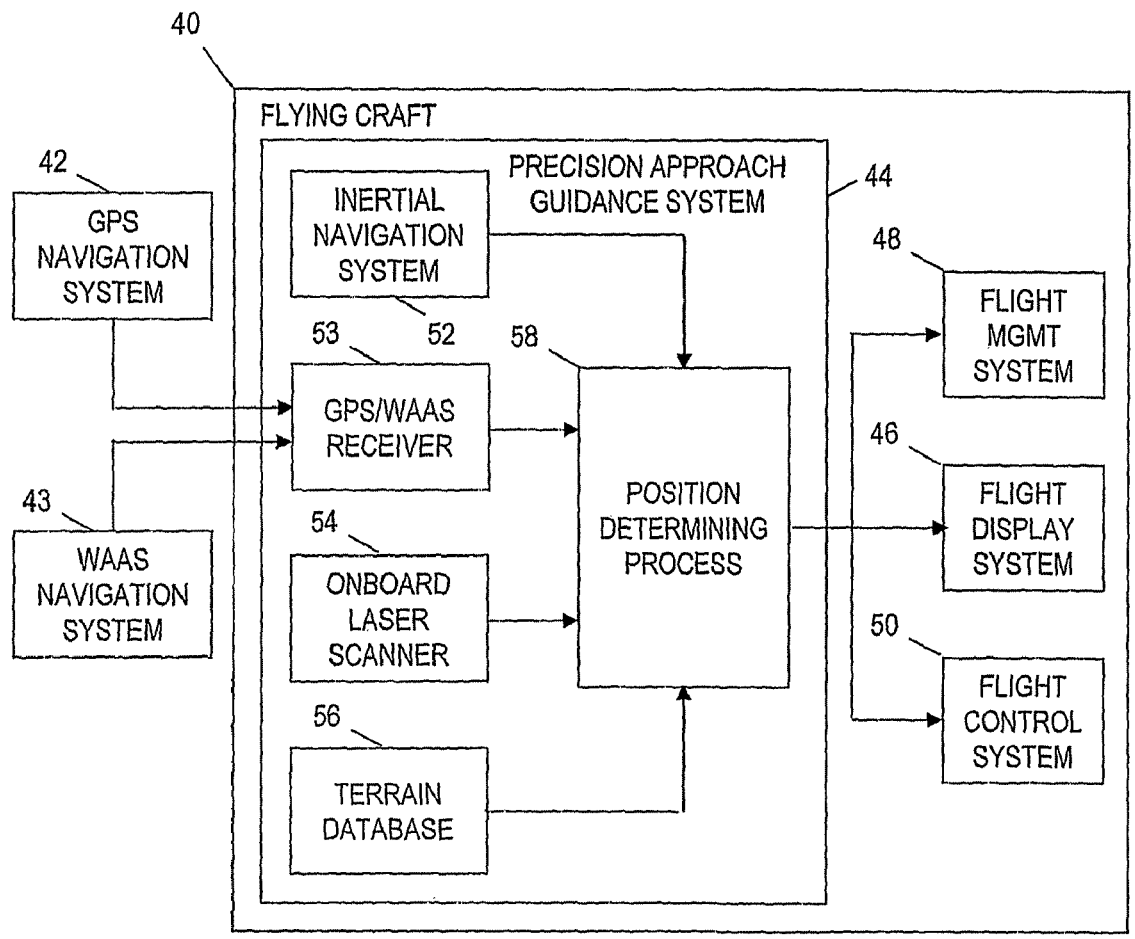
FIG. 3 is a block diagram of another exemplary embodiment of an flying craft with another exemplary embodiment of a precision approach guidance system, the flying craft being shown in an environment with global positioning system (GPS) and wide area augmentation system (WAAS) navigation systems.

With reference to FIG. 3, a flying craft 40 may be operating in an environment with a GPS navigation system 42 and/or a WAAS navigation system 43. The various embodiments of the flying craft 40 may also be operated environments that does not include a WAAS navigation system 43 or in environments that do not include GPS and WAAS navigation system 42, 43. Moreover, the various embodiments of the flying craft 40 may be operated in an environment that includes a different type of radio navigation system.

An exemplary embodiment of the flying craft 40 may include a precision approach guidance system 44 and any combination of a flight display system 46, a flight management system 48, and a flight control system 50. Any of the flight display system 46, flight management system 48, and flight control system 50 may receive guidance information from the precision approach guidance system 44 during a precision approach by the flying craft 40 to a landing site.

An exemplary embodiment of the precision approach guidance system 44 may include an INS 52, a GPS/WAAS receiver 53, an onboard laser scanner 54, a terrain database 56, and a position determining process 58 in communication with the INS 52, GPS/WAAS receiver 53, onboard laser scanner 54, and terrain database 56. The GPS/WAAS receiver 53 is optional. Moreover, in other embodiments, the GPS/WAAS receiver 53 may be replaced by separate GPS and WAAS receivers, a GPS receiver, or any suitable type of onboard radio receiver compatible with a corresponding radio navigation system with which the flying craft 40 may communicate. In other embodiments, the onboard laser sensor 54 may be replaced with any suitable type of onboard ranging sensor.

The terrain database 56 stores previously identified position-referenced terrain information associated with the landing site. The position determining process 58 repetitively determines a corrected position of the flying craft during the precision approach. In one embodiment, this corrected position is based at least in part on attitude and velocity information from the INS 52, current position-referenced terrain information based on measurements from the onboard laser scanner 54, and previously identified position-referenced terrain information from the terrain database 56.

In another embodiment, these corrected positions are determined when a value for a parameter associated with a current position of the flying craft 40 is in a first logical relation to a predetermined threshold value. In this other embodiment, the position determining process 58 repetitively determines the corrected position of the flying craft 40 during the precision approach based at least in part on attitude and velocity information from the INS 52 when the current position of the flying craft 40 is in a second logical relation to the predetermined threshold value. The predetermined threshold value is between parameter values in first logical relation and parameter values in second logical relation. In one embodiment the parameter associated with the current position of the flying craft 40 may be height above a ground level, such as height above the landing site. The height of the landing site may be known and may be expressed as a height above mean sea level (MSL). The current position of the flying craft (e.g., altitude of the flying craft) may also be expressed as a height above MSL and may be obtained, for example, from a suitable altimeter associated with the INS 52 or with another flying craft system. Alternatively, the flying craft height above MSL may be obtained from another suitable instrument. The height above the landing site may be obtained by subtracting the landing sight height above MSL from the flying craft height above MSL. The predetermined threshold value, for example, may be 50 feet, 100 feet, 200 feet, or another value at which it is desirable to transition the position determining process 58 transitions between the two processes for determining corrected position described above. The corrected position determining process that uses position-referenced terrain information may be implemented when the flying craft height above the landing site is less than or equal to the predetermined threshold value. Conversely, when the flying craft height above the landing site is greater than the predetermined threshold value, the position determining process may implement the other corrected position determining process.

In still another embodiment, the other corrected position determining process may also be based at least in part on position information from the GPS/WAAS receiver 53 as well as the attitude and velocity information from the INS 52. The position information from the GPS/WAAS receiver 53, for example, may include GPS carrier phase information and WAAS position information. The GPS carrier phase information is based on position information from the GPS navigation system 42 and may be used by the position determining process 58 to compensate for drift error associated with the INS 52. The WAAS position information is based on position information from the GPS and WAAS navigation systems 42, 43 and may be used by the position determining process 58 to compensate for position error associated with the GPS navigation system 42 and/or to further compensate for drift error associated with the INS 52.

In another embodiment, the terrain database 56 may include a 3-D terrain model associated with the landing site formed by a plurality of previously identified points. In another embodiment, the onboard laser scanner 54 may be configured to scan a terrain surface area associated with the current position of the flying craft 40 to provide the measurements used to form the current position-referenced terrain information.

Figure 4:
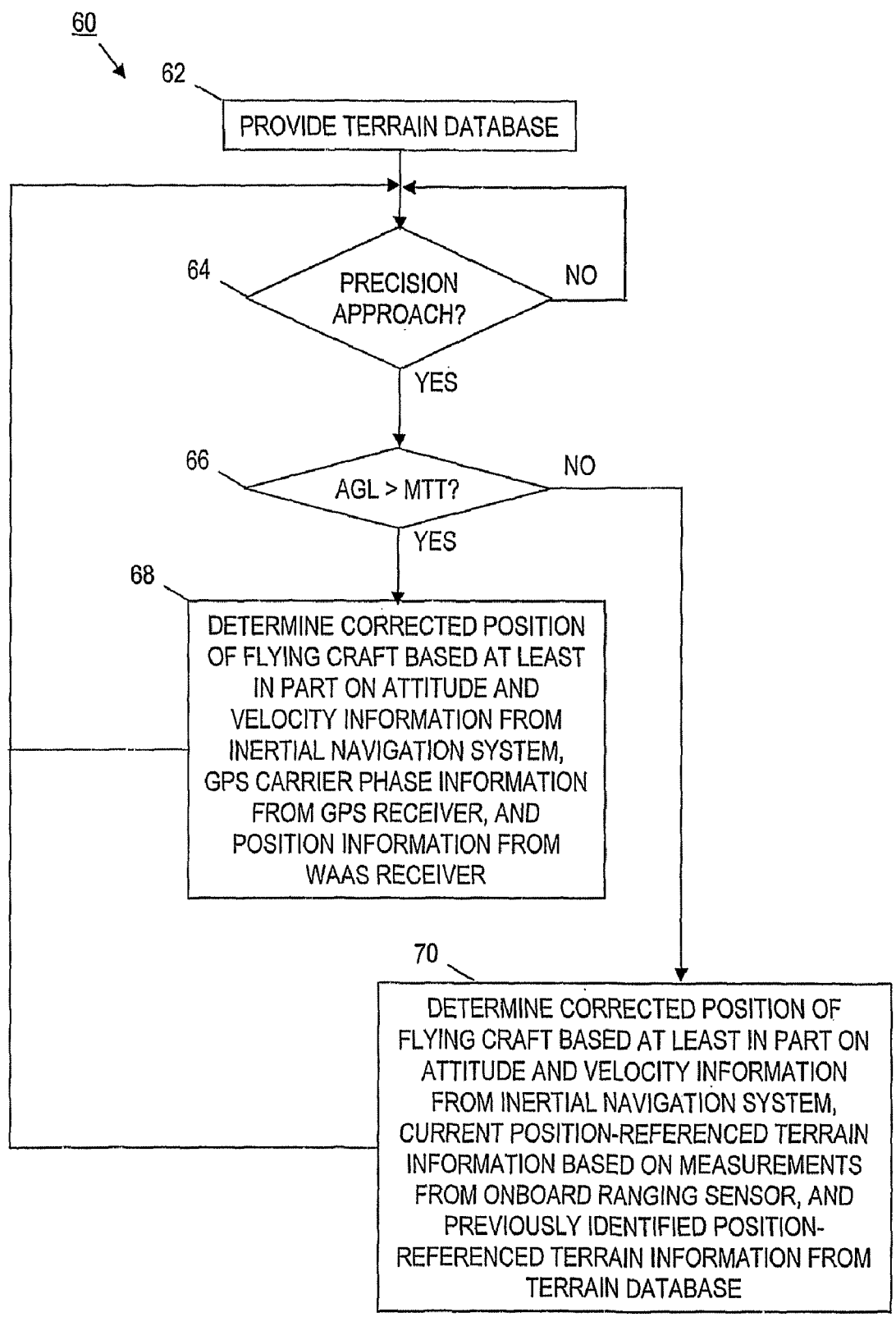
FIG. 4 is a flow chart of another exemplary embodiment of a process for providing flying craft guidance information during a precision approach to a landing site.

With reference to FIG. 4, another exemplary embodiment of a process 60 for providing flying craft guidance information during a precision approach to a landing site begins at 62 where a terrain database is provided. The terrain database stores previously identified position-referenced terrain information associated with the landing site. At 64, the process determines if the flying craft is in a precision approach. During a precision approach, a corrected position of the flying craft is determined until the precision approach is either completed, aborted, or ended in some other manner. Next, at 66, the process determines if a height above ground level (AGL) (e.g., flying craft height above the landing site) is greater than a mode transition threshold (MTT) (e.g., predetermined threshold value such as 1,200 feet above the landing site).

The corrected position may be based on an alternate corrected position determining processes depending on, for example, whether or not the flying craft height above the landing site is greater than a predetermined threshold (i.e., MTT) or not. If AGL is greater than MTT, the corrected position may be based at least in part on attitude and velocity information from an INS, GPS carrier phase information from a GPS receiver, and position information from a WAAS receiver (68). The GPS carrier phase information and WAAS position information are optional. In another embodiment, the GPS carrier phase information and WAAS position information may be replaced by position information from an onboard radio receiver associated with a corresponding radio navigation system.

Conversely, if AGL is not greater than MTT, the corrected position may be based at least in part on attitude and velocity information from an INS, current position-referenced terrain information based on measurements from an onboard ranging sensor, and previously identified position-referenced terrain information from the terrain database (68). After the corrected position is determined (68, 70), the process returns to 64. At 64, if the flying craft is not in a precision approach, the process waits for the flying craft to begin a precision approach.

Figure 5:
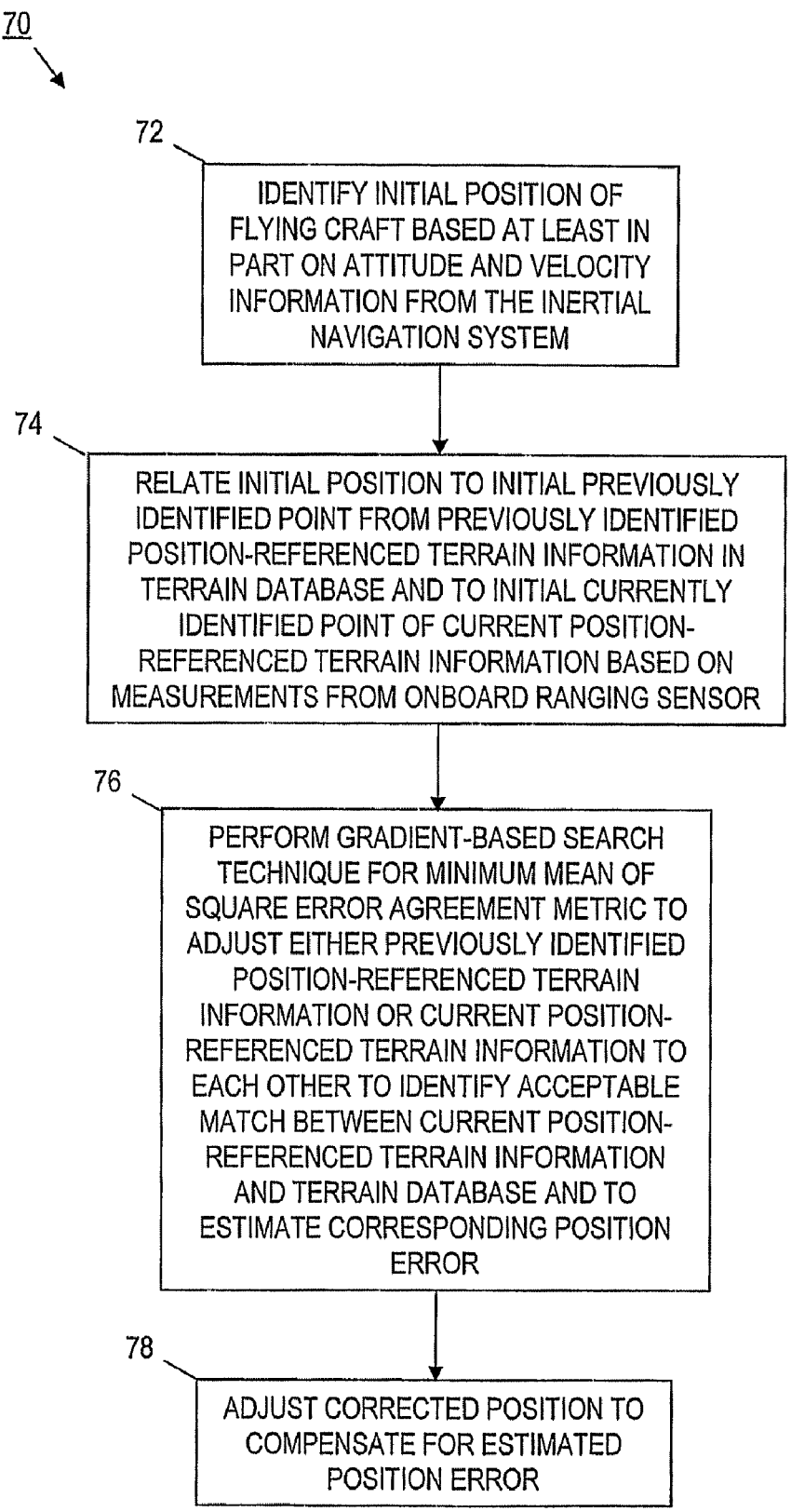
FIG. 5 is a flow chart of an exemplary embodiment of a process for determining a corrected position of a flying craft.

With reference to FIG. 5, an exemplary embodiment of the corrected position determining process 36, 70 of FIGS. 2 and 4, respectively, begins at 72 where an initial position of the flying craft, based at least in part, on attitude and velocity information from the INS may be identified. Next, at 74, the initial position may be related to an initial previously identified point from the previously identified position-referenced terrain information in the terrain database. The initial position may also be related to an initial currently identified point of the current position-referenced terrain information based on measurements from the onboard ranging sensor. At 76, a gradient-based search technique for a minimum mean of the square error agreement metric may be performed to adjust one of the previously identified position-referenced terrain information and current position-referenced terrain information in relation to each other to identify an acceptable match between the current position-referenced terrain information and the terrain database. Upon completion of the gradient-based search technique, the previously identified position-referenced terrain information and current position-referenced terrain information are suitably matched to each other and the amount of adjustment may be used to estimate a corresponding position error. For example, in one embodiment, the current position-referenced terrain information may be adjusted while the previously identified position-referenced terrain information is held stationary. Conversely, in another embodiment, the previously identified position-referenced terrain information may be adjusted while the current position-referenced terrain information is held stationary. At 78, the corrected position is adjusted to compensate for the estimated position error. The overall process for providing flying craft guidance information continues as shown in FIGS. 2 and 4.

The terrain-referenced precision approach guidance system described herein may provide precision guidance to an aircraft without the use of ground-based electronic navigation components installed at a landing site, such as an airport, areas surrounding the landing, and/or other ground locations associated with the landing site. When used in conjunction with an inertial measurement unit (IMU) and a high accuracy/resolution terrain database, the terrain-aided precision approach guidance system can provide navigation and guidance information to pilots.

A terrain-referenced precision approach guidance system can be viewed as a terrain-aided precision approach guidance system adapted for use during final approach to an airport or another type of landing site. A ground sensor (e.g., ALS) can be used to gather range measurements to the terrain surface associated with the position of the aircraft. This data is matched in some fashion with an onboard terrain database to find an estimated position error solution and to update or correct a position solution from an inertial sensor-based navigator (e.g., INS). The system, for example, may use a high resolution terrain database (e.g., ~one meter post spacing) in conjunction with a ground sensor capable of providing, for example, tens of thousands of independent terrain elevation measurements per second with, for example, centimeter-level accuracy. When combined with data from the inertial navigator, the system may be capable of providing near meter-level horizontal and vertical position estimates as guidance information for a precision approach. Furthermore, the system may also capitalize on: 1) position and integrity benefits provided by a WAAS to reduce the initial search space size and 2) availability of high accuracy/resolution terrain databases. The terrain-aided precision approach guidance system may be used to provide guidance cues for a precision approach.

The development and recent proliferation of airborne LIght Detection And Ranging (LIDAR) mapping systems has made dense (e.g., one meter horizontal post spacing or better) and accurate (e.g., elevation measurement accuracies near 20 cm) terrain models available. A terrain-referenced positioning system may be capable of near meter-level position estimates when, for example, a LIDAR terrain database is used in conjunction with an ALS. For additional information on the use of a LIDAR terrain database with an ALS, see Campbell et al., "Terrain Reference Navigation using Airborne Laser SCAnner (ALASCA)—Preliminary Flight Test Results," Proceedings from the 2004 ION AM, Dayton, Ohio, June 2004, the contents of which are fully incorporated herein by reference.

The terrain-referenced precision approach guidance system uses an ALS, a high accuracy/resolution LIDAR terrain database, and an INS to provide vertical and horizontal guidance for a desired runway or another type of landing site. For example, the approach path to a runway may be defined as a straight in, three degree approach, similar to instrument landing system (ILS) approaches currently in use. The WAAS may be used to provide guidance and to calibrate the INS until the aircraft descends to a selected minimum height AGL. At the selected minimum height AGL, the aircraft transitions from WAAS/INS-based positioning to terrain-aided inertial navigator-based positioning to complete the precision landing guidance.

An airborne LIDAR mapping system may include an ALS, an IMU, and a dual frequency GPS receiver. A ground component of the mapping system may include a position reference station consisting of a dual frequency GPS receiver located at a surveyed position. Combining the data from these sensors allows for precise Earth-referenced (e.g., 20 cm accuracy) measurement of the point illuminated by the ALS. Most of today's airborne LIDAR mapping systems operate in the near infra-red spectrum and their eye-safety classifications range from Class 1 to Class 4b.

Post-processing of the data from an airborne LIDAR mapping system can be used to create a dense point cloud of geo-referenced measurements of terrain surfaces (e.g., natural Earth surfaces and artificial surfaces, such as buildings and other constructions). Depending on the velocity and altitude of the mapping aircraft, the ALS scanner speed/pattern, and pulse repetition frequency (PRF) of the laser, the density and coverage of the point cloud can be varied. Many systems today are flown to generate a nominal post spacing of one meter. LIDAR systems can measure both the first and last return allowing for the measurement of both the canopy top and the bare Earth.

A rectangular area of 15 km by 6 km containing the approach to a runway at an airport may be used for the terrain database. The database may be provided in a point cloud (non-uniform point spacing) in American standard code for interface and interchange (ASCII) format. Points may be identified horizontally in universal trans-mercator (UTM) coordinates and vertically in height above MSL. For use in the real-time terrain-referenced precision approach guidance system, the point-cloud terrain data may be triangulated and then re-sampled into a uniform one by one meter spaced horizontal grid.

An ALS-based terrain-referenced positioning system may provide greater than 10,000 independent measurements per second, given a terrain database with one meter post spacing and an ALS PRF greater than 10 kHz. Given the large number of measurements, relatively straight-forward scoring methods can be used for position estimation. One scoring metric or agreement used for the real-time terrain-referenced precision approach guidance system may include the MSE. The MSE is based on a set of differences between of a set of measured geo-referenced laser elevation measurements and a corresponding set of terrain database elevations given an estimated 'a priori' position. The MSE agreement metric of the computed set of differences may be computed by squaring the elevation differences and computing the mean of the set.

At least two alternative position estimation methods may be used to search for the minimum MSE agreement metric (i.e., best match). In one embodiment, an exhaustive grid search may be used to perform an exhaustive search in the horizontal and vertical space to find the best agreement. While this method is more likely to find the minimum MSE, if it exists in the defined search space, it is computationally intensive and does not lend itself to real-time position estimations given current computer technology. In another embodiment, a gradient-based search may be used. This search assumes that the agreement metric surface (two-dimensional (2-D)) or agreement metric volume (3-D) has a unique minimum which can be found by traveling in the directions of the gradient. Additional information on these position estimation methods is provided below. For more detailed information, see Campbell et al., "Terrain Reference Navigation using Airborne Laser SCAnner (ALASCA)—Preliminary Flight Test Results," Proceedings from the 2004 ION AM, Dayton, Ohio, June 2004, the contents of which are fully incorporated herein by reference.

The exhaustive grid search algorithm includes evaluation of the MSE for a set of candidate positions within the search grid. For the horizontal search space the search grid is defined as a matrix of offsets in the east and north directions centered around the initial (a priori) position estimate. The MSE is computed for each element of the matrix of offsets creating a surface whose shape is defined by the MSE at the particular offset. This surface may be referred to as the MSE surface and the best agreement is defined by the minimum in the MSE surface. The position that corresponds to this minimum is considered the new position estimate.

The characteristics of the error surface may be explored using LIDAR data collected during flights over desired area in a suitable aircraft. For example, two sets of exhaustive searches on the data collected during the flights may be examined. A first exhaustive search, for example, may be over an area of +/−30 meter in the east/west and north/south directions with a one meter step interval ($\Delta x=1$ m, $\Delta y=1$ m) and a +/−four meter search around the aircraft's a priori height with a 30 cm step interval. An example of one of the horizontal search spaces for these parameters is shown in FIG. 6.

Figure 7:
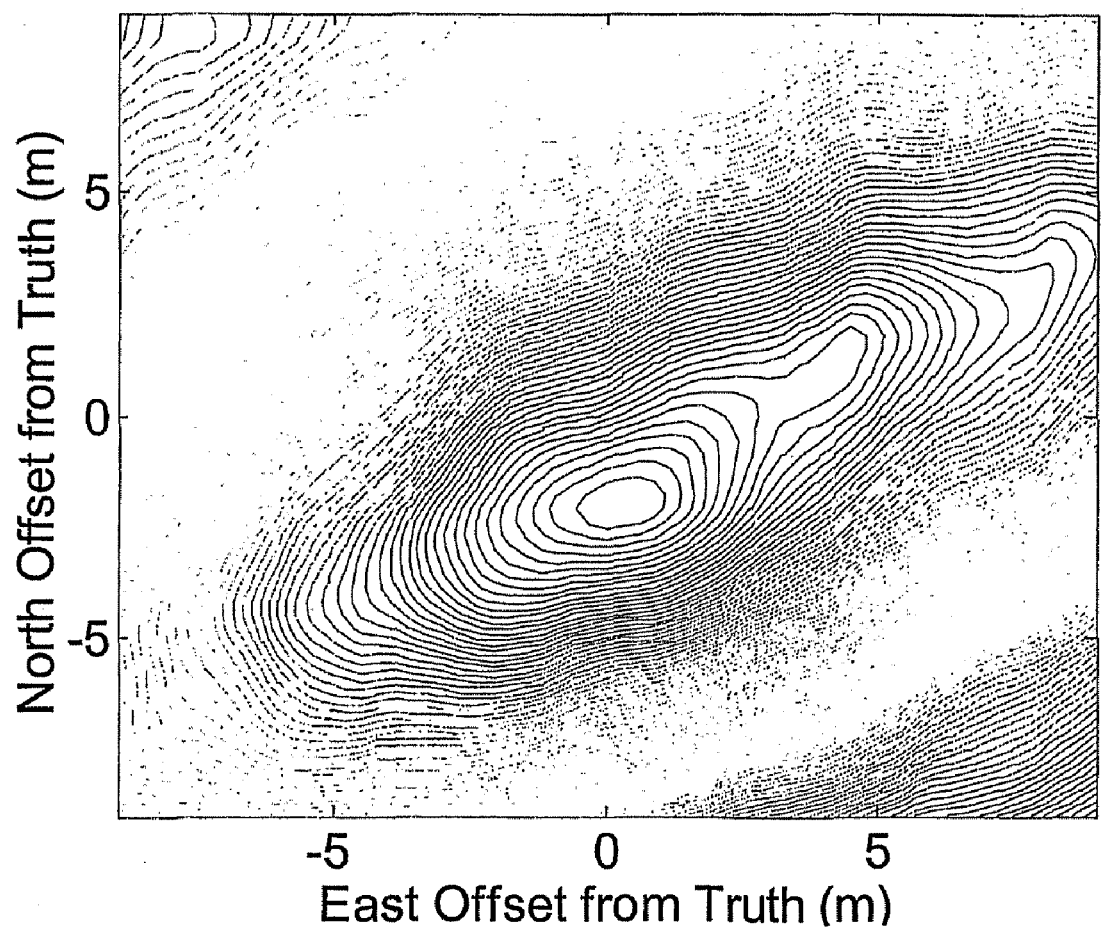
FIG. 7 is a graph of an MSE agreement metric using an exhaustive grid search algorithm between a set of geo-referenced elevation measurements for an exemplary 18 meter by 18 meter horizontal search space and a corresponding geo-referenced area in an exemplary terrain database.

A second exhaustive search, for example, may be over an area of +/−nine meter in the east/west and north/south direction with a search area with a 30 cm step interval and +/−four meter search around the aircraft's a priori height with a 30 cm step interval. FIG. 7 shows exemplary results of a horizontal search with these parameters.

Figure 6:
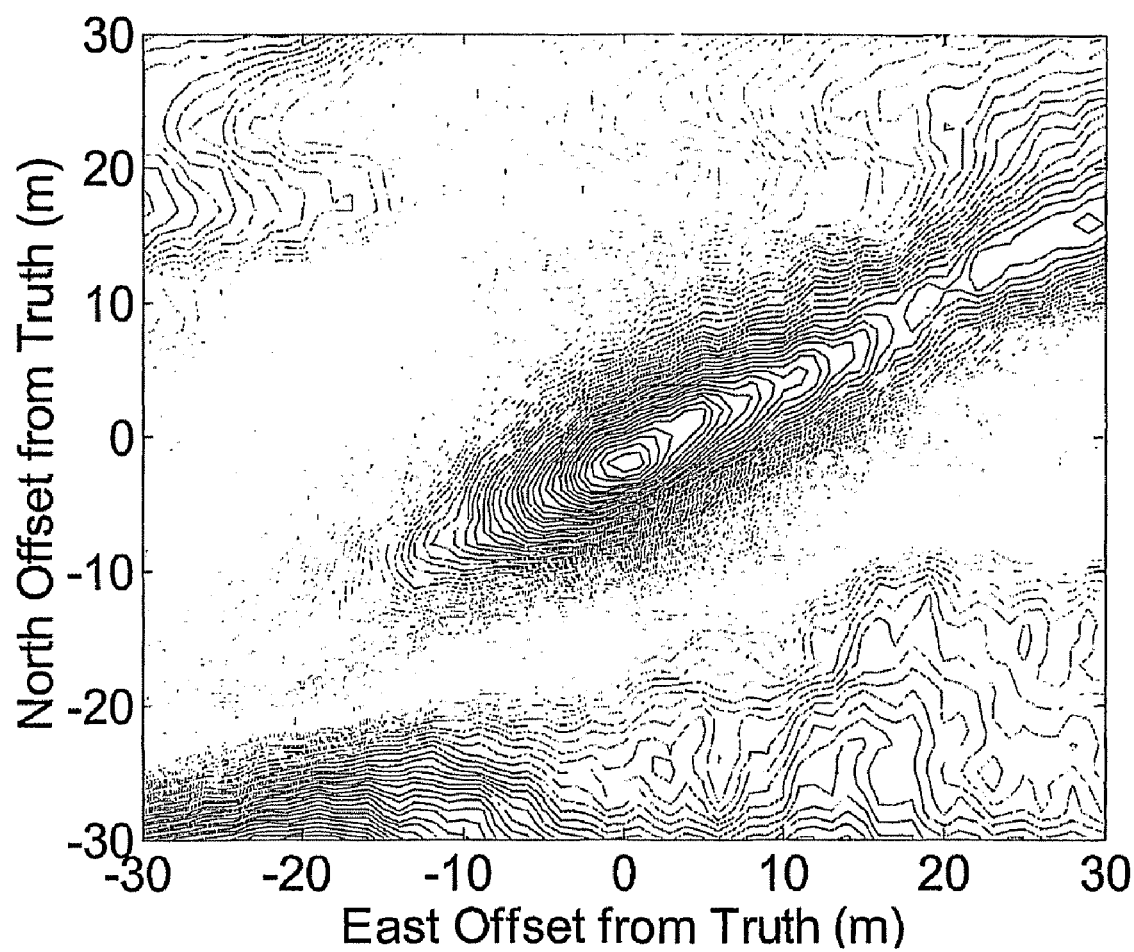
FIG. 6 is a graph of a mean of the square error (MSE) agreement metric using an exhaustive grid search algorithm between a set of geo-referenced elevation measurements for an exemplary 60 meter by 60 meter horizontal search space and a corresponding geo-referenced area in an exemplary terrain database.

Each of the exhaustive searches in FIGS. 6 and 7, for example, may use one second of ALS data at a PRF of 33,333 Hz. This corresponds to N=33,333 measurements for the position estimation process. The time required to perform this exemplary exhaustive search, for example, is about 23 minutes on a Pentium 4, 1.8 GHz personal computer (PC) with 1.3 GB of RAM. Although the exhaustive search provides good insight into the characteristics of the MSE surface, alternative methods for finding the MSE surface minimum may be necessary for implementation of a real-time terrain-referenced precision approach guidance system.

With reference to FIG. 6, one can see that more than one local minimum exists on the MSE surface when the area of interest is 60 meters by 60 meters. However, as the 'area of interest' is reduced to 18 meters by 18 meters (see FIG. 7) the number of local minima is reduced to one. The shape of the MSE, given a 'good' initial position estimate allows for the use of a gradient-based search to find the MSE minimum. This may increase the speed of the MSE calculation and may provide a real-time terrain-referenced precision approach guidance system implementation. The gradient-based search can be applied to the terrain-aided precision approach guidance system, since it can be determined in advance, based on the terrain database, that a single local minimum exists in the search space.

As described above, further reduction in required computations can be achieved by using gradient-based techniques to search for the MSE surface minimum given the assumption there is only one minimum in the search area. The gradient at a point on a discrete grid surface can be approximated to the first order by differencing the data around that point. Many methods exist to approximate the gradient at specific locations on a grid defined surface.

Figure 8:
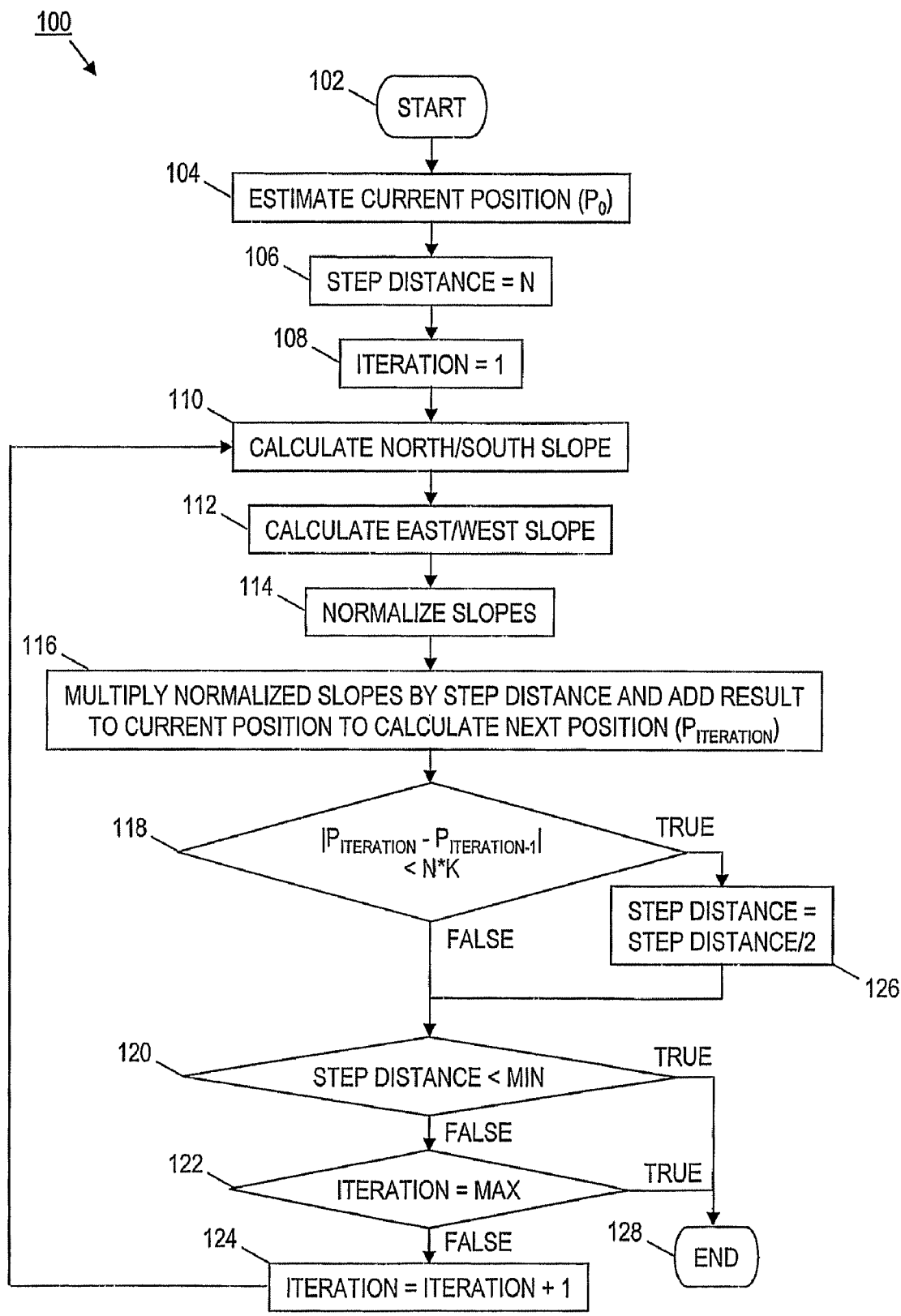
FIG. 8 is a flow chart of an exemplary embodiment of a process for determining an MSE agreement metric using a gradient-based search algorithm between two sample data sets.

With reference to FIG. 8, an exemplary gradient-based search algorithm 100 starts at 102. An estimate at a current position ($P_0$) solution may be performed (104) and a "step distance" may be initialized at a scalar value (N) (106). For example, the step distance may be initially set to one meter. In other embodiments, the step distance may be initialized at a larger or smaller real number. At 108, an iteration counter or variable may be initially set to one for the first iteration of the algorithm. Next, the direction of a negative gradient for the current position may be determined, for example, by calculating a north/south slope (110) by computing, for example, the sum of square error at, for example, locations +/−0.5 meters north/south of the current position, calculating an east/west slope (112) by computing, for example, the sum of square error at, for example, locations +/−0.5 meters east/west of the current position, and normalizing the two slopes (114).

The next current position ($P_{ITERATION}$) along the gradient-based search, for example, may be calculated in 116 by multiplying the normalized slopes by the "step distance" and adding the result to the last current position ($P_{ITERATION-1}$). At 118, the algorithm may determine if the distance between the next current position ($P_{ITERATION}$) and the last current position ($P_{ITERATION-1}$) is less than the "step distance" (N) multiplied by a scalar value (K). This may be represented as $|P_{ITERATION}-P_{ITERATION-1}|<N*K$. For example, the scalar value (K) may be set to 1.5 for this computation. If the result in 118 is false, at 120, the algorithm may determine if the step distance is less than a predetermined minimum value. If the result in 120 is false, at 122, the algorithm may determine if the iteration counter is equal to a predetermined maximum value (i.e., if "max iterations" have been reached). If the result in 122 is false, at 124, the iteration counter is incremented by one and the algorithm returns to 110 for another iteration.

If the result in 118 is true, at 126, the step distance is divided by two and the algorithm advances to 120.

If the result in 120 or 122 is true, the algorithm has reached its end.

Figure 9:
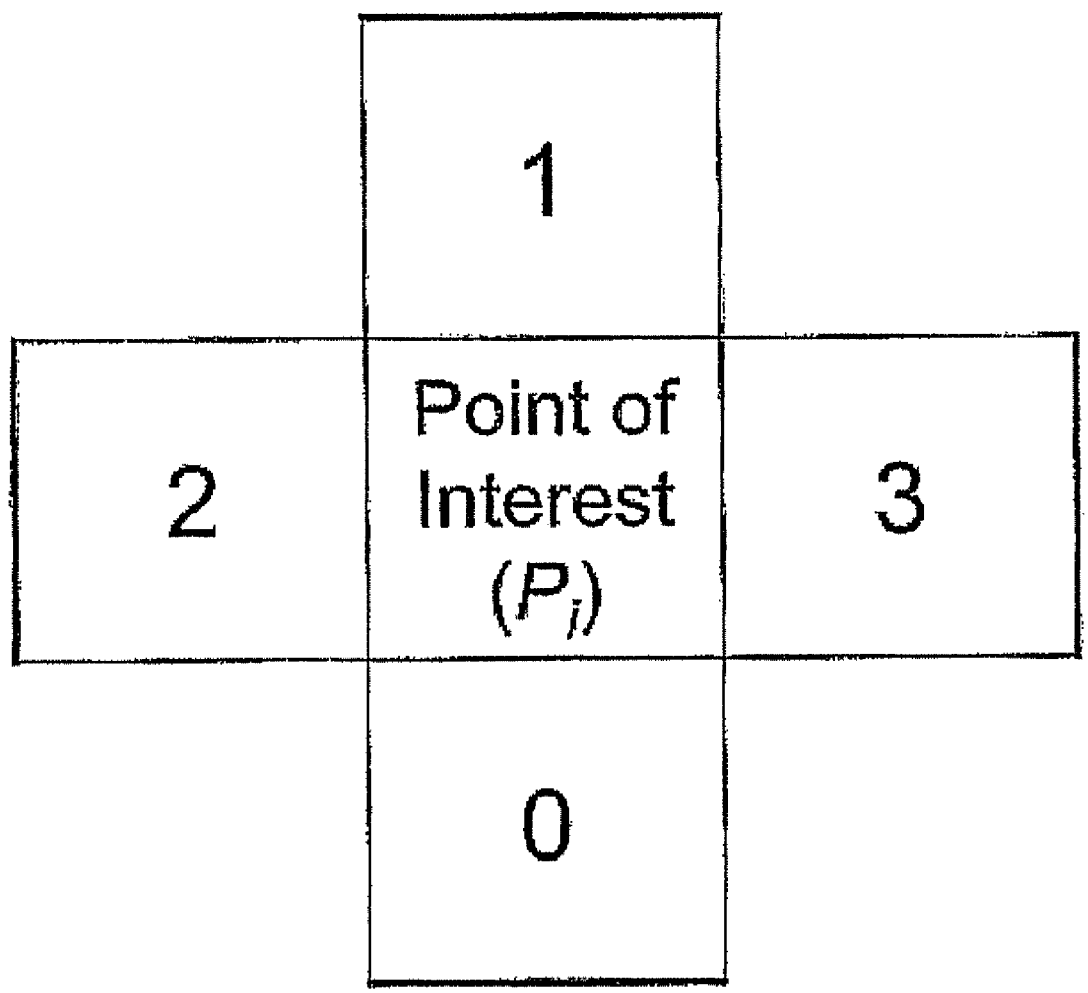
FIG. 9 is a diagram showing sample areas around a point of interest used to calculate a gradient through the point of interest in conjunction with a gradient-based search algorithm to determine an MSE agreement metric between two sample data sets.

With reference to FIG. 9, sample areas (0, 1, 2, 3) around a point of interest ($P_i$) associated with an iteration of the gradient-based search algorithm are shown. Data associated with the sample areas is used in conjunction with the MSE agreement metric to calculate a gradient through the point of interest ($P_i$). The slope of the gradient indicates a directions in which to step in one sample data set in preparation for the next iteration of the algorithm. The slope of the gradient is acceptably minimized, the two sample data sets are suitably matched. Each sample area, for example may have a plurality of points associated therewith which may be averaged in some manner. Thus, the algorithm may be implemented for non-uniformly distributed data sets as well as uniform data sets and it is not necessary for the resolution of the two data sets to match.

Figure 10:
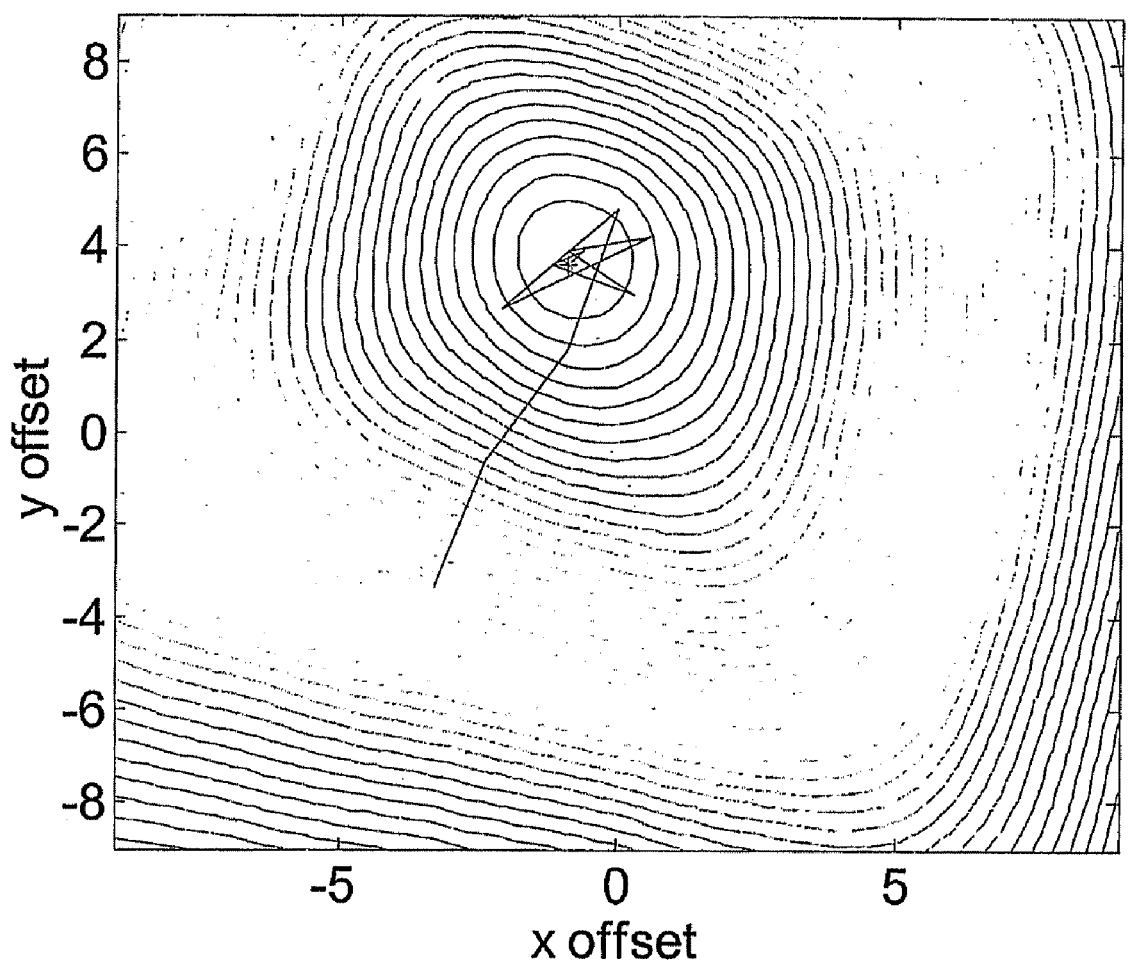
FIG. 10 is a graph of an MSE agreement metric using a gradient-based search algorithm between a set of geo-referenced elevation measurements for an exemplary 18 meter by 18 meter horizontal search space and a corresponding geo-referenced area in an exemplary terrain database.

As described in the above algorithm, an estimated MSE surface gradient may be used to determine the direction of the next step in the gradient-based search. The distance traveled in each step is controlled by another mechanism which reduces the distance as the point is seen oscillating around a minimum. FIG. 10 illustrates one example of the MSE surface gradient-based search. The application of the gradient-based search in the terrain-aided precision approach guidance system is described below in further detail.

Figure 11:
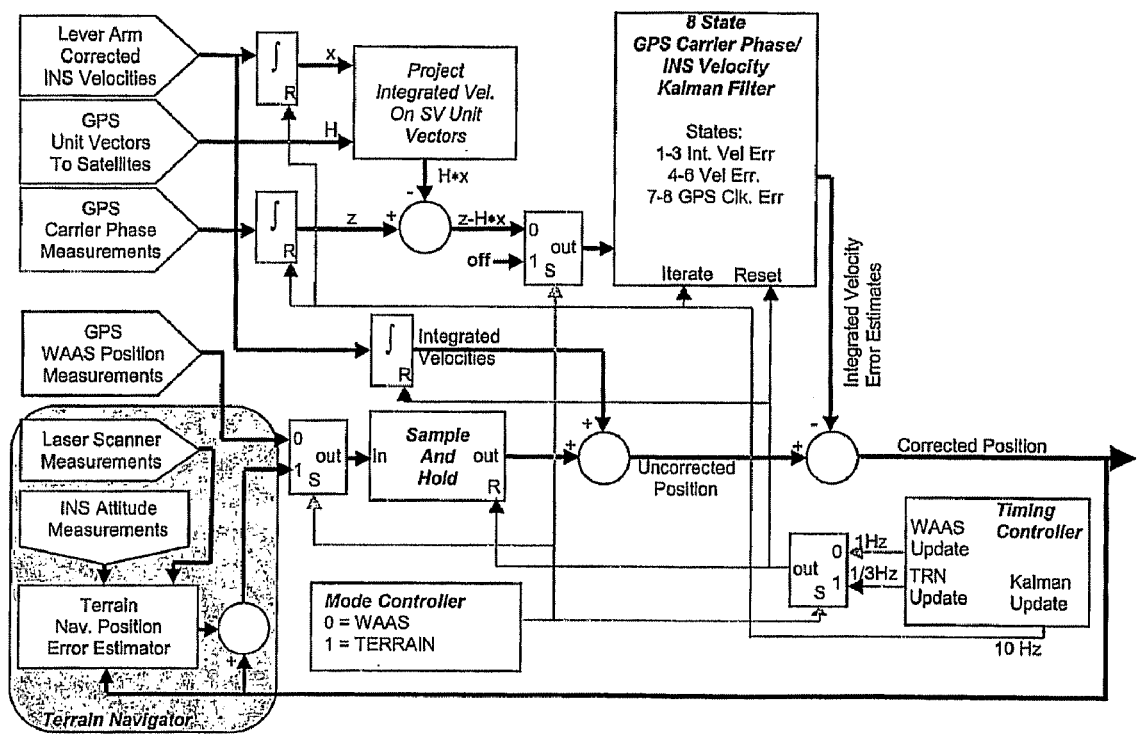
FIG. 11 is a block diagram of an exemplary embodiment of a precision approach guidance system for a flying craft.

A terrain-referenced precision approach guidance system may provide precision approach guidance to a pilot via vertical and horizontal deviation cues. In flight, a real-time precision approach guidance system may operate under two modes during an aircraft approach. The first mode may be referred to as a WAAS-aided inertial navigator mode and the second mode as a terrain-aided inertial navigator mode. FIG. 11 provides a block diagram of another exemplary embodiment of a precision approach guidance system. As the precision approach begins, the aircraft may be in WAAS-aided mode. During this phase, WAAS may be used to update the position estimates and GPS integrated carrier phase measurements may be used to calibrate the integrated velocities from the INS. The WAAS-aided mode may be active when the Mode Controller is set to zero. WAAS may be used until MTT is reached. At altitudes below MTT, WAAS may no longer be sufficient for a precision approach. For additional detail on the use of Kalman filtering to estimate drift error of an INS using a GPS carrier phase measurement, see Brown et al., Introduction to Random Signals and Applied Kalman Filtering with Matlab Exercises and Solutions, $3^{rd}$ ed., John Wiley & Sons, 1996, the content of which is fully incorporated herein by reference.

When the altitude of the aircraft is at or below MTT, the mode may be switched to terrain-aided inertial navigator mode. The terrain-aided mode may be active when the Mode Controller is set to one. In terrain-aided inertial navigator mode, the final velocity error estimates in the Kalman filter may be frozen and the corrected INS integrated velocities may be added to the last position estimate to form the corrected position. The corrected positions may be used by the terrain-aided inertial navigator to transform the points measured by the ALS to a geo-referenced frame. The terrain position estimator may then be used to compute the estimated error in the current corrected position. This estimated error may be fed back into the corrected position.

The position update function may be performed in the terrain-aided precision approach guidance system by comparing measurements from the ALS to data in the terrain database. ALS measurements may be converted to a set of elevation values expressed in the terrain database coordinate frame to perform this comparison. Thus, a set, S, of number, N, ALS range measurements, $S_{ALS}=\{t_i, \alpha_i, \rho_i | i=1, \ldots, N\}$, where $t_i$=time, $\alpha_i$=laser scan angle, and $\rho_i$=laser range, may be converted from the aircraft body frame to a point cloud in an East North Up (ENU), local-level coordinate frame identified by the set, $S_{ENU}=\{t_i, x_{ENU}(t_i) | i=1, \ldots, N\}$. The origin of the local level coordinate frame may coincide with the laser scanner optics (LSO) reference point at time $t_0$. The transformation from body to ENU frame may require attitude estimates (pitch, $\theta$, roll, $\phi$, and heading, $\psi$), and integrated aircraft velocity starting at $t_0$. Estimated incremental ENU frame rotations can be included for completeness. However, the effect the ENU frame rotations have on the geo-reference point cloud may be negligible over the period of three seconds at the certain aircraft (e.g., DC-3) velocities. The integrated velocity estimates may be computed as follows:

$$\hat{x}_{LSO,ENU}(t_i) = \hat{x}_{LSO,ENU}(t_0) + \int_{t_0}^{t_i} \hat{v}_{LSO,ENU}(t) dt \quad (1)$$

where the velocity estimates, $\hat{v}_{LSO,ENU}(t)$, may be provided by a Honeywell HG1150 IRU.

The local-level point cloud coordinates can then be converted to World Geodetic System 1984 (WGS 84) coordinates defined by the set:

$$S_{LLH}=\{t_i, \hat{x}_{LLH}(t_i)=[\hat{\phi}(t_i) \hat{\lambda}(t_i) \hat{h}_{ALS}(t_i)]^T | i=1, \ldots, N\}.$$

The ENU to WGS 84 coordinate transformation at time-epoch $t_i$ may be a function of the predicted position of the LSO at the time-epoch $t_0$ and $t_i$. The corresponding terrain elevation, $h_{DEM}(\hat{\phi}(t_i), \hat{\lambda}(t_i))$ at the estimated latitude coordinate, $\hat{\phi}(t_i)$, and longitude coordinate, $\hat{\lambda}(t_i)$, of $S_{LLH}$, may then be retrieved from the terrain database server using bilinear interpolation on the four closest terrain database points, provided the terrain database is stored as a uniformly spaced grid of elevations.

The agreement metric may be defined as the difference between the measured height and the height synthesized from the terrain database. This difference or disparity can be computed for each laser range measurement. Thus, the set, P, of N disparities can be obtained:

$$P=\{p(t_i)=\hat{h}_{ALS}(t_i)-h_{DEM}(\hat{\phi}(t_i), \hat{\lambda}(t_i)) | i=1, \ldots, N\} \quad (2)$$

The MSE can now be evaluated using the set of N disparities, or:

$$MSE_N = \frac{1}{N} \sum_{i=1}^{N} \{p(t_i)\}^2 \quad (3)$$

Minimizing the MSE is equivalent to minimizing the Sum Squared Error (SSE), $SSE_N = N \cdot MSE_N$. In one exemplary embodiment, $N \leq 30,000$, which is equivalent to approximately three seconds of data.

The real-time terrain-referenced precision approach guidance system may use a gradient-based method for determining the aircraft position estimate. The predicted aircraft position at each time-epoch, $t_i$, may be replaced by a candidate aircraft position plus a position step in the direction of the MSE surface gradient:

$$\hat{x}_{LSO,ENU}(t_i)|_k = \hat{x}_{LSO,ENU}(t_i)|_{k-1} + m_{k-1} \Delta x_{LSO,ENU}|_{k-1} \quad (4)$$

where $\cdot|_k$ indicates the $k^{th}$ iteration in the search, $m_k$ is the step size at iteration k, and $\Delta x_{LSO,ENU}|_{k-1}$ may be found by:

$$\Delta x_{LSO,ENU}|_k = -\frac{1}{\|\nabla SSE_N|_k\|} \left[ \frac{dSSE_N|_k}{dx} \quad \frac{dSSE_N|_k}{dy} \quad 0 \right]^T \quad (5)$$

where $\nabla SSE_N|_k$ is the gradient of the SSE surface evaluated at $\hat{x}_{LSO,ENU}(t_i)|_k$ and $dSSE_N|_k/dx$ and $dSSE_N|_k/dy$ are the individual gradient components at $\hat{x}_{LSO,ENU}(t_i)|_k$.

The algorithm can now be described as follows:
k=0:
$\hat{x}_{LSO,ENU}(t_i)|_0$=initial position estimate
Compute $\Delta x_{LSO,ENU}|_0$ using equation (5) $m_0$=initial step size (e.g., one meter)
k=1 to num_iterations:
Compute position estimate vector $\hat{x}_{LSO,ENU}(t_i)|_k$ using equation (4).
Compute $\Delta x_{LSO,ENU}|_k$ using equation (5) $m_k$=distance to travel in the $\Delta x_{LSO,ENU}|_k$ direction:

$$m_k = \begin{cases} m_{k-1} & \text{if } |x_k - x_{k-2}| \geq A\, m_{k-1} \text{ or } k < 2 \\ 0.5 m_{k-1} & \text{if } |x_k - x_{k-2}| < A\, m_{k-1} \end{cases}$$

where A=travel distance reduction decision constant (e.g., 1.5)

As described in the above algorithm, an estimated MSE (SSE) surface gradient may be used to determine the direction of the next step in the gradient-based search. The distance traveled in each step may be controlled by another mechanism that reduces the distance as oscillations around a minimum are observed. The oscillating state is determined by computing the distance between the current gradient-based calculation position and the previous gradient-based calculation.

A Kalman filter may be used as an inertial velocity error estimator. The input observations fed to the Kalman filter may be the differences between the GPS integrated carrier phase for each space vehicle (SV) and the integrated inertial velocities mapped on the line of sight (LOS) vectors between the user position and each SV. For example, the Kalman filter may have the following eight states: i) states 1-3, integrated velocity error in ENU, ii) states 4-6, velocity error in ENU; and iii) states 7-8, GPS clock bias and drift. The integrated velocity error estimates (states 1-3) may be used to remove the estimated error in the HG1150 IRU's integrated velocities.

The WAAS position measurements and GPS carrier phase measurements for the initial approach phase may be provided, for example, by a NovAtel OEM-4 L1/L2/WAAS GPS receiver. WAAS position accuracies, for example, may be less than five meters in the horizontal and vertical when comparing them to post-processed Kinematic GPS. The PPS signal from the NovAtel receiver may be used to provide time synchronization between the Navigation Computer and Data Collection and Distribution computer. Interrupt service routines may be used to synchronize the computer time through the level-converted, pulse-extended, PPS signal.

Figure 12:
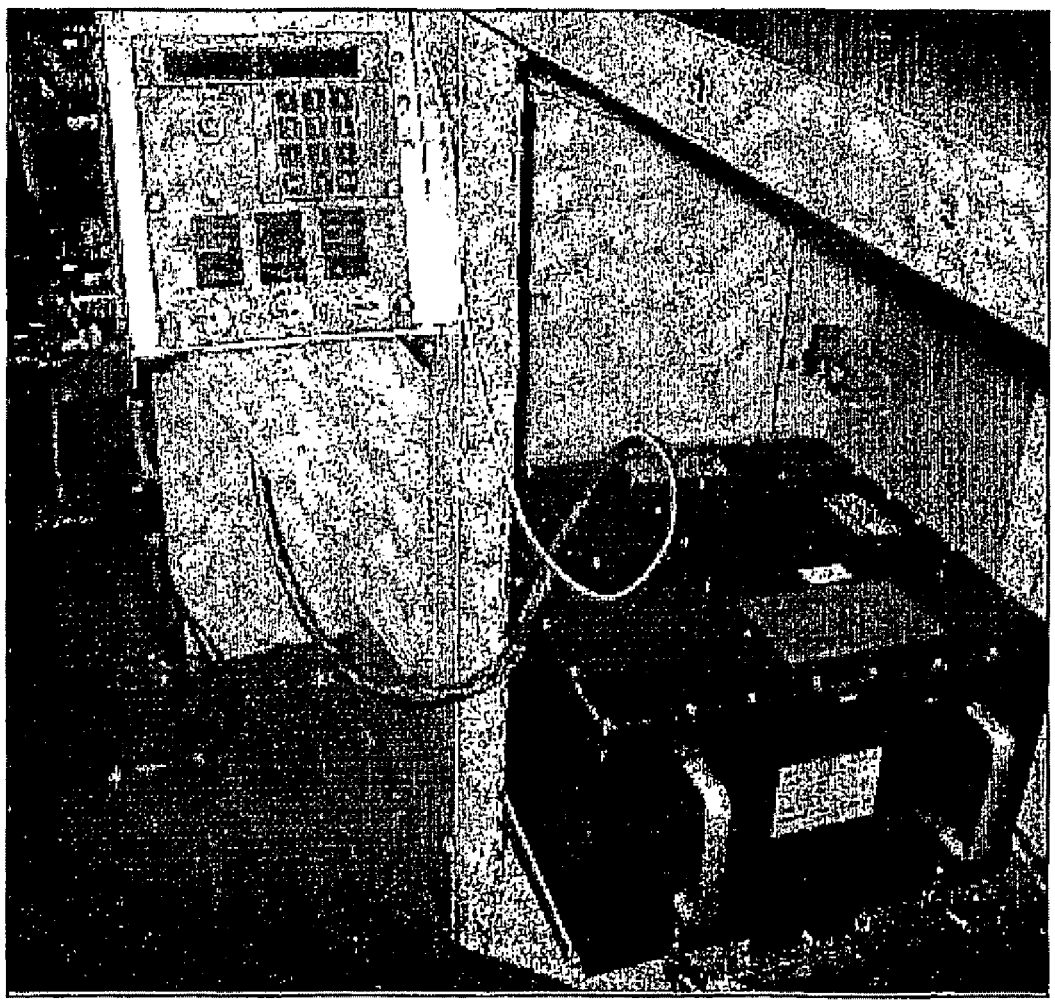
FIG. 12 shows a Honeywell HG1150 inertial reference unit (IRU) from an exemplary embodiment of a precision approach guidance system installed in a DC-3 aircraft.

Navigation frame velocities and aircraft attitude data may be obtained, for example, from the Honeywell HG1150 navigation grade IRU shown in FIG. 12. As shown, the HG1150 IRU may be installed just aft of a right-seat pilot in a DC-3 aircraft. The IRU may be a standalone ring laser gyro (RLG) IRU with, for example, a one nautical mile per hour position performance. Data may be collected, for example, via the HG1150's ARINC-429 interface which may operate at 100 kbs.

Horizontal velocity data may be provided at 20 Hz with a bandwidth of 2 Hz, vertical velocity data may be provided at 25 Hz with a bandwidth of 8 Hz, aircraft pitch and roll angles may be provided at 50 Hz with a bandwidth of 8 Hz, and heading angles may be provided at 20 Hz with a bandwidth of 2 Hz. Transport delays due to filtering performed in the HG1150 and sending over the databus may be less than 110 ms.

Figure 13:
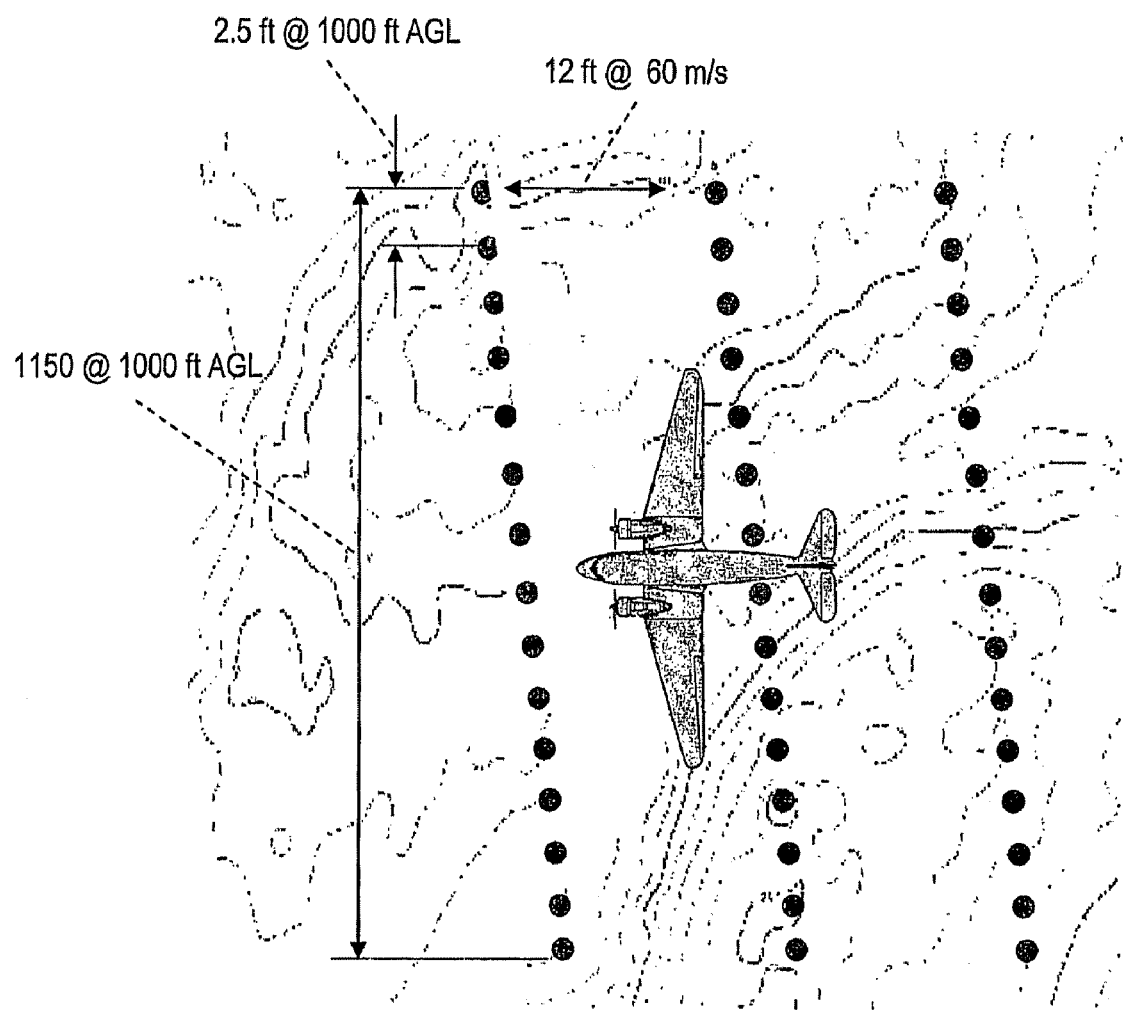
FIG. 13 shows an exemplary scan profile for collection of distance measurements to a terrain surface area by a Riegl LMS-Q114i airborne laser scanner (ALS) in an exemplary embodiment of a precision approach guidance system.

Terrain measurements may be made, for example, by the Riegl LMS-Q140i ALS. For the real-time terrain-referenced precision approaches, the LMS-Q140i may be configured to scan, for example, with a 60 degree cross-track scan angle at 15 scans per second with an average PRF of 10,000 range measurements per second (i.e., 10 kHz, 30 kHz on line). In this exemplary configuration, assuming an altitude of 1,000 AGL and a ground speed of 60 m/s, the distance between scans in the along-track direction may be approximately twelve feet and the distance between cross-track scans may be about 2.5 feet as shown in FIG. 13. The LMS-Q140i scan rate can be set as high as 40 scans per second. This may provide a more uniform distribution laser measurement.

The LMS-Q140i may include the following operating characteristics: i) Scan angle range: 80 deg, ii) Max Scan Speed: 40 scans/sec, iii) Scan Angular Resolution: 0.018 deg, iv) Measurement Range, v) 350 meter for target rho >20%, vi) 700 m for target rho >80%, vii) Measurement Accuracy: +−five cm, viii) Laser beam divergence: approx one mrad, and ix) Eye Safety: Class 1 (eye safe). The precision approach guidance system may also implement an onboard ranging sensor with a lower PRF, a lower scan rate, and/or different scanning characteristics than LMS-Q140i.

Figure 14:
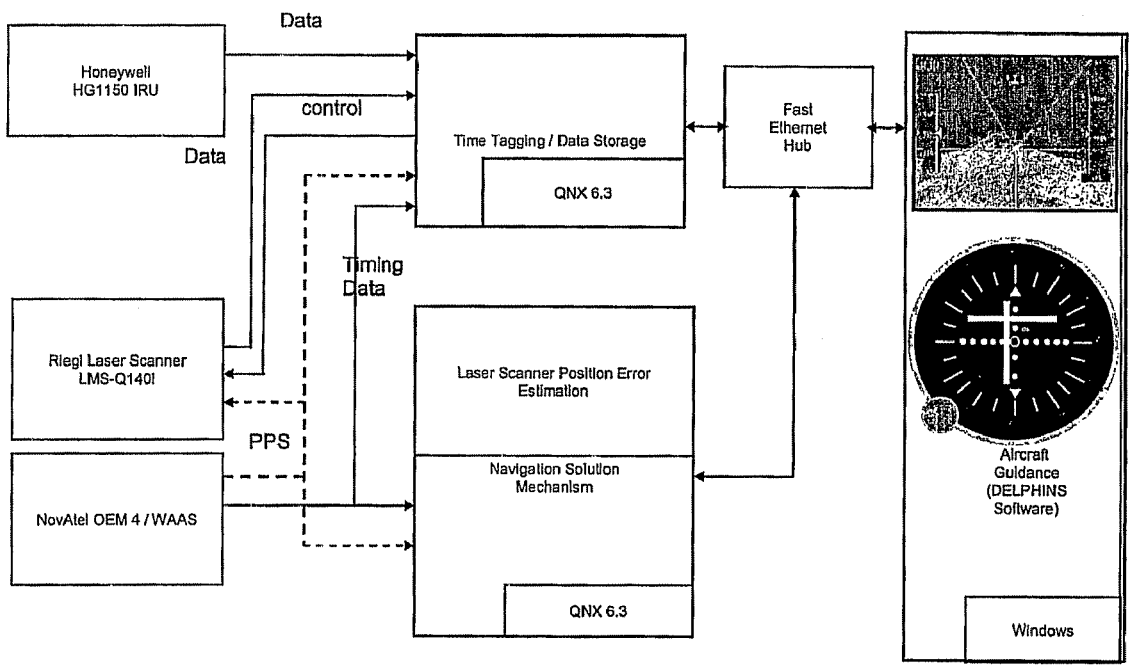
FIG. 14 is a block diagram of another exemplary embodiment of a precision approach guidance system.
Figure 15:
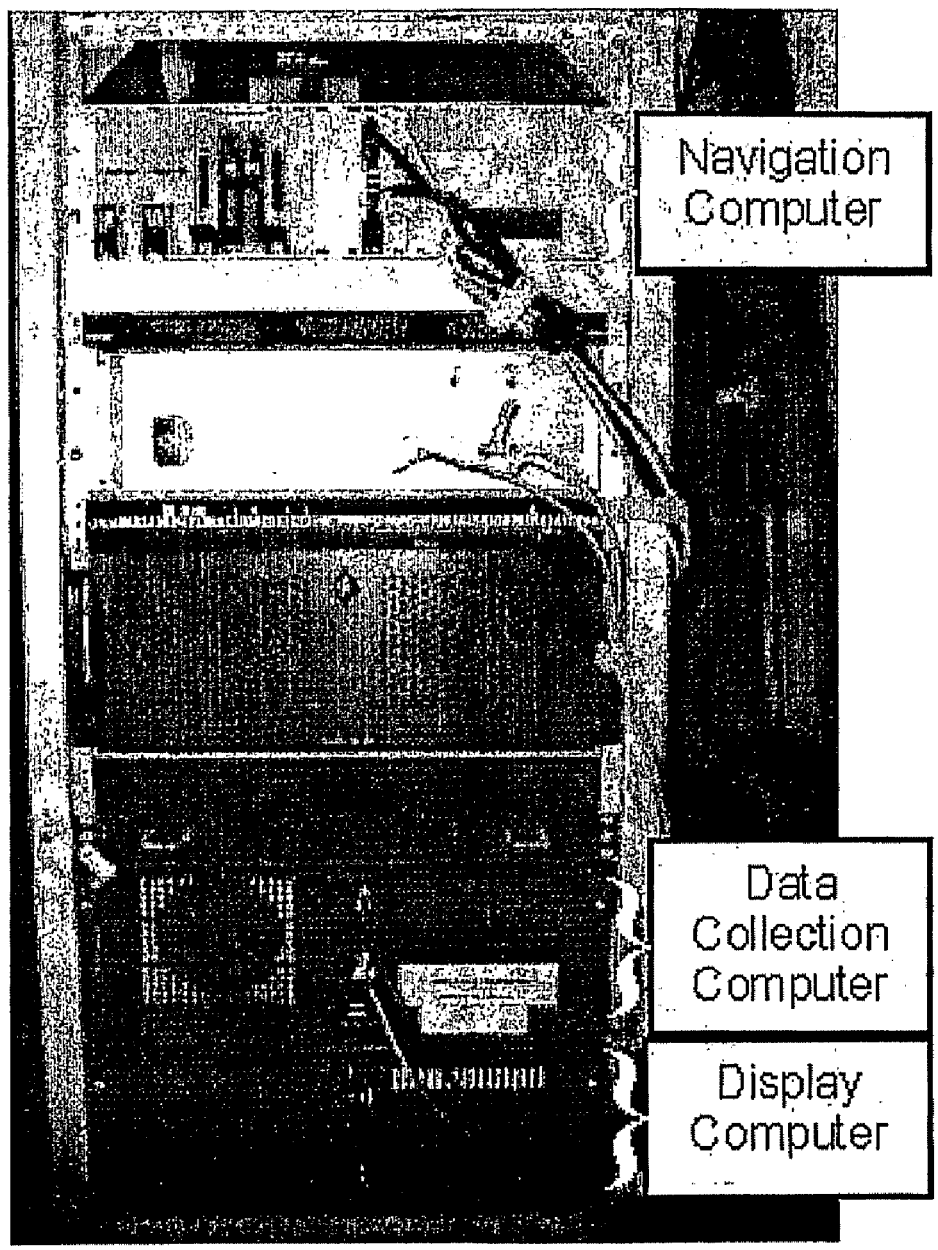
FIG. 15 shows a data collection and distribution (DCD) computer, a navigation (NAV) computer, and a display computer from an exemplary embodiment of a precision approach guidance system installed in a DC-3 aircraft.

Data from the various sensors may be collected and time tagged by the DCD computer. The DCD computer is shown in the block diagram of FIG. 14 and pictured in a DC-3 Research Computer Rack in FIG. 15. The DCD may be configured to allow for data collection and distribution as well as post-mission playback of the real-time terrain-referenced precision approach guidance system. The DCD hardware may include a 4U 19" rack mountable computer configured to allow data collection, for example, position, range, etc. data from the NovAtel OEM 4/WAAS GPS Receiver via an RS-232 serial port, from the Honeywell HG1150 IRU via an ARINC-429 data bus card and corresponding 100 kbs interface, LS range/angle data from the Riegl LMS-Q140i laser scanner via an ECP parallel port and LS mode control data from an RS-232 serial port, and from the Honeywell HG8505 radar altimeter via an RS-232 serial port.

Along with data collection and distribution, another critical roll of the DCD may include data time-tagging. The DCD may be synchronized to GPS time using the pulse per second (PPS) signal from the NovAtel GPS Receiver and time information from the NovAtel data messages. Time synchronization may be performed by pulse extending the PPS signal to allow for the triggering of a serial port interrupt in the DCD. The constant length of the pulse extension may be corrected in the DCD, for example, by software. The time accuracy in the computer may be 10 μsec or less.

Quick UNIX (QNX) 6.3 may be used as the operating system for the DCD computer. Data may be read from each sensor by independent resource managers, which are similar to device drivers. The use of resource managers may allow for the efficient division of processing time between the data collection, distribution, and time-stamping with the ability to provide higher priority to time sensitive tasks, such as time-stamping. Once data is read and time-tagged by its corresponding resource manager, it may be stored in a circular buffer allowing other programs global access to the data by a simple read statement. Data may be distributed to the NAV computer via a high speed (100 Mb) transmission control protocol/Internet protocol (TCP/IP) Ethernet link. Code in the DCD computer may be compiled using a GNU C-compiler.

The aircraft state (position, velocity, attitude, etc.) and guidance cues for approach may be computed in the NAV computer. The NAV computer may receive sensor information from the DCD computer via a TCP/IP Ethernet link, process and extrapolate forward the data, and send the aircraft state data to the display computer via a user datagram protocol (UDP) Ethernet link. Like the DCD computer, the NAV computer, may be synchronized to GPS time via NovAtel's PPS signal. Since time may be synchronized between the DCD and NAV computer, it may be possible to reduce the apparent latency in the pilot display by extrapolating the data sent to the tunnel computer where appropriate. QNX 6.3, for example, may also be used as the operating system for the NAV computer. Like in the DCD, this allows for multiple threads to be set at various priority levels to perform varied tasks such as: DCD computer data reception, GPS time synchronization, position processing mode selection, terrain-referenced position estimation calculations, inertial velocity error estimations, and the sending of data to the tunnel computer. Code in the NAV computer may be compiled using a GNU C-compiler.

Figure 16:
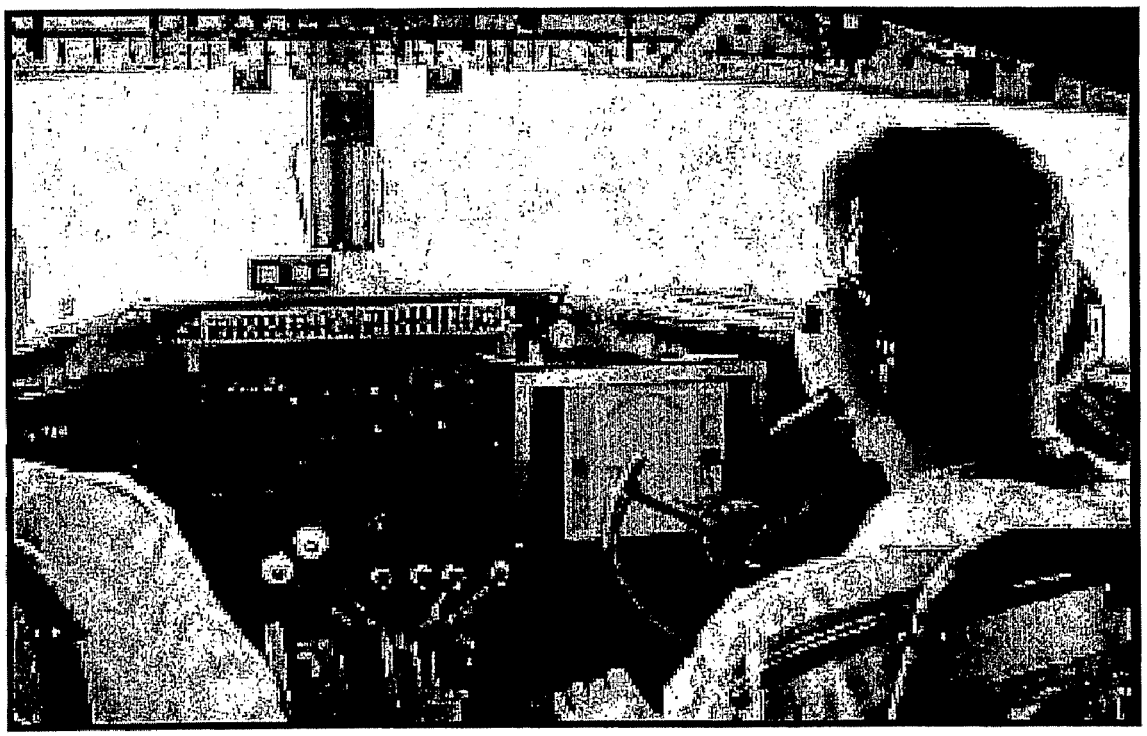
FIG. 16 shows a cockpit display for the right seat pilot driven by an exemplary embodiment of a precision approach guidance system installed in a DC-3 aircraft.

Guidance cues may be provided to the pilot through, for example, a liquid crystal display (LCD) mounted for use by right seat pilot as shown in FIG. 16. The LCD display may be driven, for example, by tunnel software (e.g., DELPHINS software) running on the tunnel computer. The DELPHINS software was developed and is maintained by Delft University of Technology, Delft, The Netherlands and used by Ohio University under a Memorandum of Agreement. This configuration provides a heads-down display (HDD) which can provide both a flight director style guidance display and a synthetic vision guidance display to the pilot.

In one embodiment, the terrain-referenced precision approach guidance system provides: i) real-time operation and ii) aircraft guidance that meets the accuracy requirements necessary to conduct a precision approach. As described herein, both vertical and horizontal guidance are provided for a precision approach. Aircraft precision approach guidance systems are required to meet specific levels of accuracy, integrity continuity and availability. The parameter levels are dependent on the category (CAT) of the approach. The CATs are specified by the height at which the pilot must visually acquire the runway environment and make a decision if he continues the approach or make a missed approach. This height is referred to as the decision height (DH). The pilot's decision will be based on visibility and/or the runway visual range (RVR) which are usually driven by weather conditions. For example, a CAT I approach has a DH of not lower than 200 feet and a visibility of not less ½ a statute mile or an RVR of not less then 1,800 feet.

Accuracy requirements defined for a CAT IIIb local area augmentation system (LAAS) approach are 5.0 meters in the horizontal and 2.9 meters in the vertical 95% of the time. The terrain-referenced precision approach guidance system may provide guidance to a pilot for a precision approach while achieving real-time position solutions with accuracies comparable to the LAAS CAT IIIb requirements.

Figure 17:
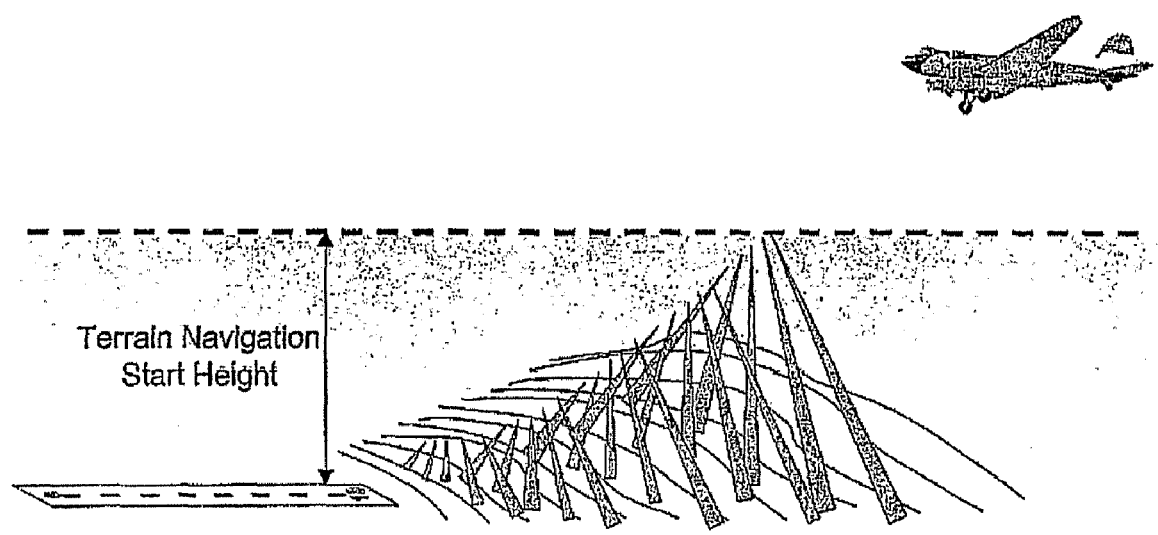
FIG. 17 shows an exemplary precision approach to a landing site by an aircraft equipped with an exemplary precision approach guidance system.

With reference to FIG. 17, an exemplary precision approach to a landing sight by an aircraft equipped with an exemplary precision approach guidance system reflects a terrain navigation start height. The terrain navigation start height is associated with the height of the aircraft in reference to the landing sight. At and below the terrain navigation start height, the precision approach guidance system is terrain-aided as shown by the onboard range sensor measurements depicted along aircraft approach path. The range sensor measurements are shown in an exemplary illustrative scan pattern. In actuality, a much larger number of measurements are provided.

Figure 18:
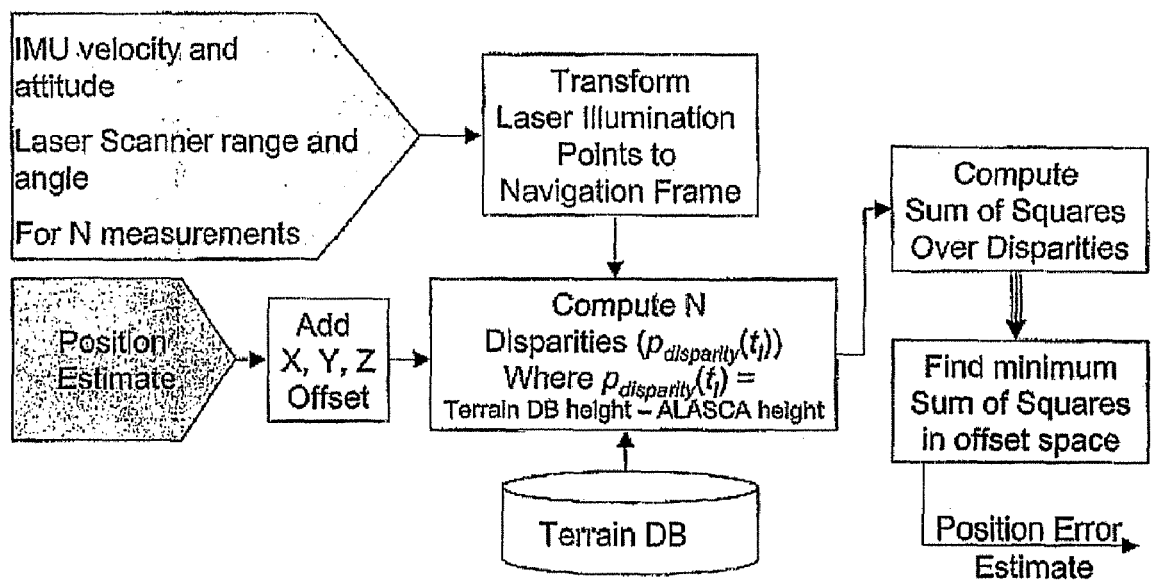
FIG. 18 is a block diagram of another exemplary embodiment of a precision approach guidance system.

With reference to FIG. 18, an exemplary embodiment of a precision approach guidance system operates on the principal of finding the location at which the best spatial match exists between a set of measured terrain heights and a set of terrain heights given by a terrain database. The initial proposed navigation system uses IMU measurements to provide aircraft attitude and velocity estimates required to compute the relative laser radar terrain measurements between each position update. The Add and Compute blocks in FIG. 18 are repeated for each X, Y, Z offset a Sum of Squares is computed over to create the Sum of Squares Error Surface.

Figure 19:
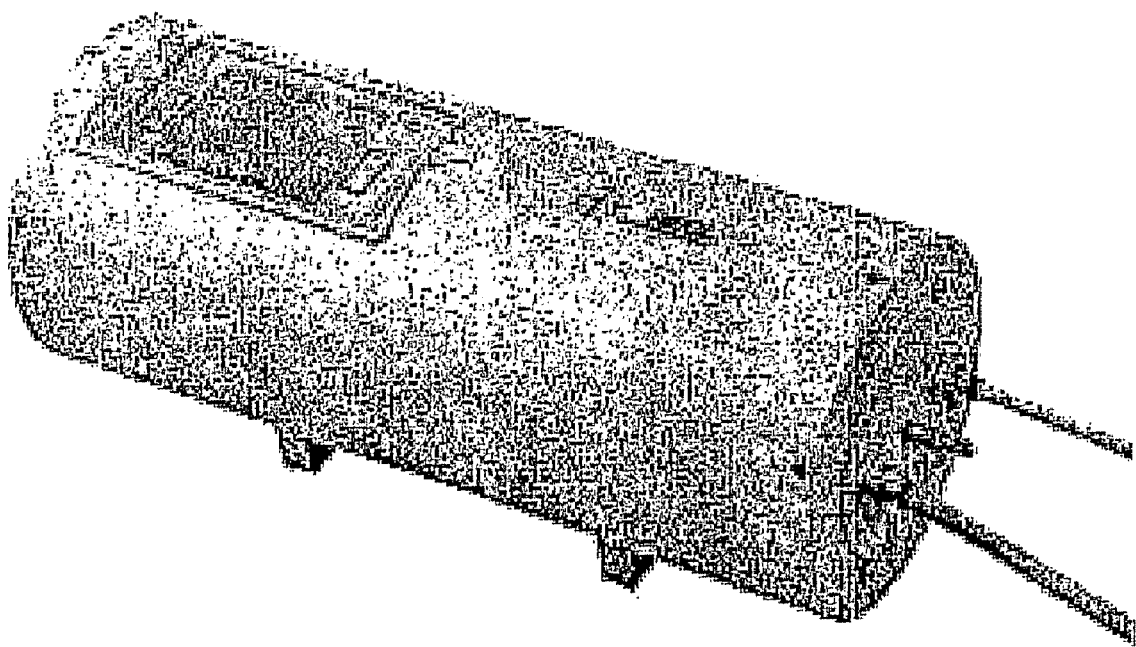
FIG. 19 shows a Riegl LMS-Q140i ALS.

With reference to FIG. 19, a view of a commercially available onboard ranging sensor available from Riegl is shown. Namely, Riegl's model LMS-Q140i ALS is pictured.

Figure 20:
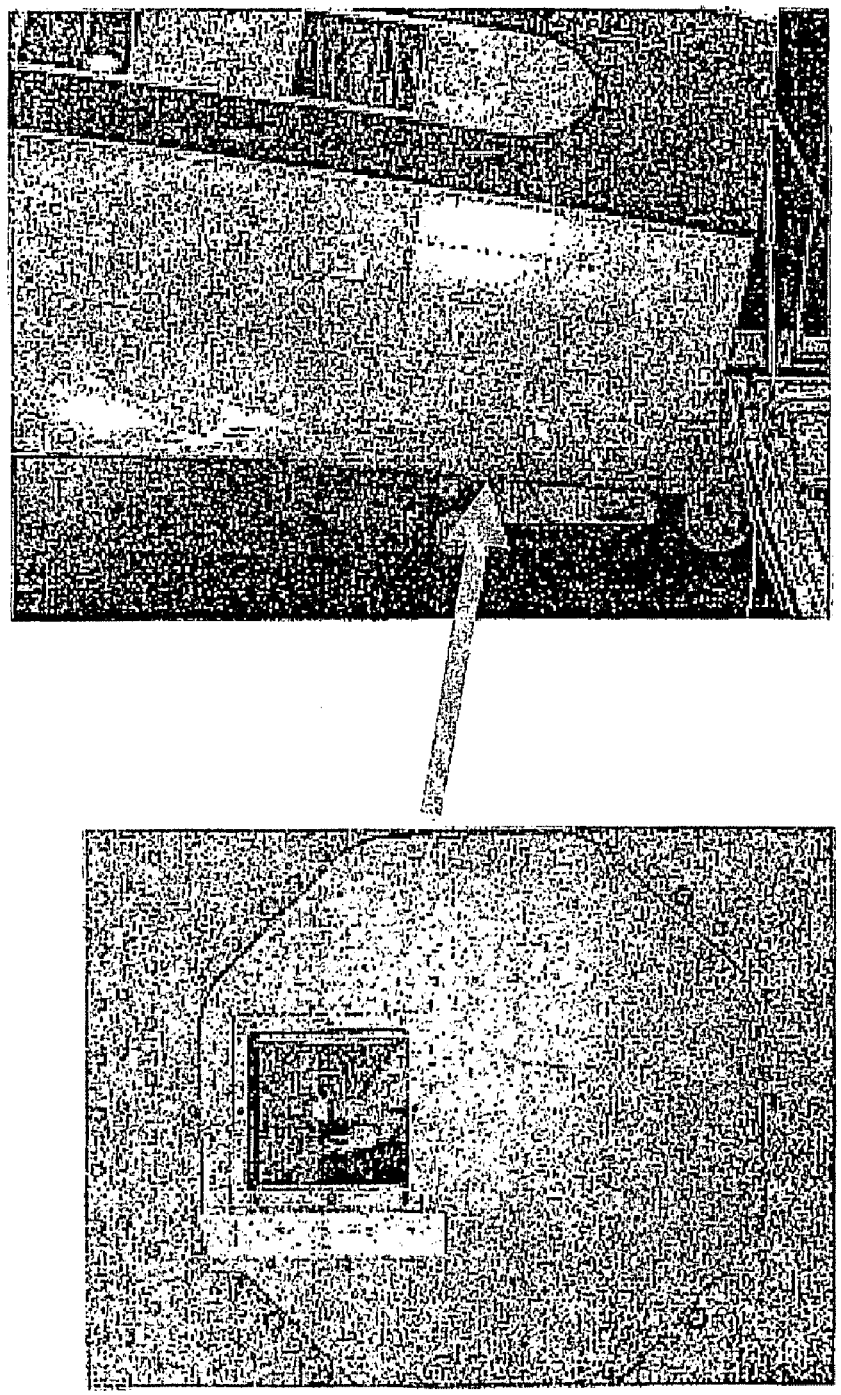
FIG. 20 shows an onboard ranging sensor installation for an exemplary embodiment of a precision approach guidance system in an aircraft.

With reference to FIG. 20, the installation location of an onboard ranging sensor in an exemplary embodiment of a precision approach guidance system is shown for an exemplary aircraft.

Figure 21:
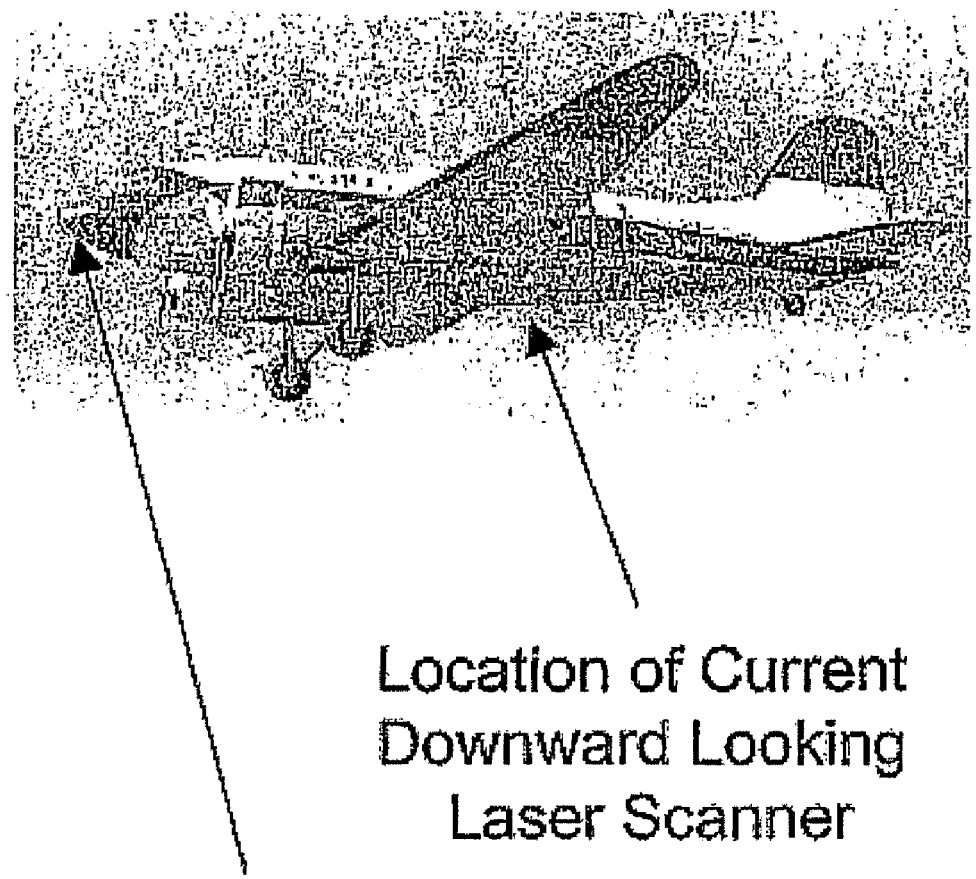
FIG. 21 shows an aircraft equipped with an exemplary embodiment of a precision approach guidance system with locations for laser scanners highlighted.

With reference to FIG. 21, an aircraft equipped with an exemplary embodiment of a precision approach guidance system may include a downward looking laser scanner or a forward looking laser scanner. The locations of laser scanner in both the downward and forward looking configurations are indicated in the drawing.

Figure 22:
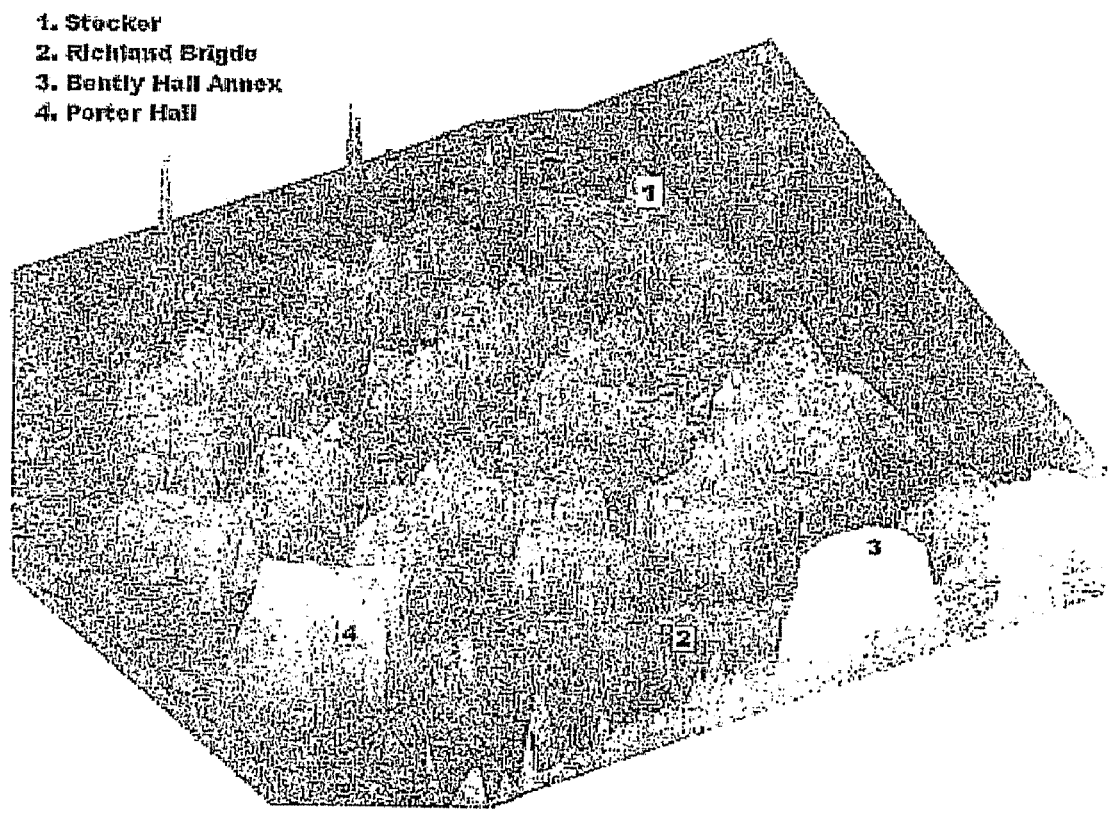
FIG. 22 shows a three-dimensional (3-D) perspective view of an exemplary terrain database.

With reference to FIG. 22, a 3-D perspective view of an exemplary terrain database shows surfaces of buildings and other constructions as well as natural Earth surfaces for a portion of the Ohio University campus.

While the precision approach guidance system and associated methods have been illustrated by the description of various embodiments thereof, and while the embodiments have been described in considerable detail, it is not the intention of the applicants to restrict or in any way limit the scope of the appended claims to such detail. Additional advantages and modifications will readily appear to those skilled in the art. For example, components and processes can be changed without changing the substantive functions performed by the components and processes described herein. Therefore, the general concept for a precision approach guidance system and associated methods, in its broader aspects, is not limited to the specific details, the representative apparatus, and illustrative examples shown and described. Accordingly, departures may be made from such details without departing from the spirit or scope of the applicants' general concept.

The invention claimed is:

1. A method of providing flying craft guidance information during a precision approach to a landing site, the method including:
   a) providing a terrain database storing previously identified position-referenced terrain information associated with the landing site, wherein terrain information includes elevation values; and
   b) repetitively determining a corrected position of the flying craft during the precision approach based at least in part on attitude and velocity information from an inertial navigation system, current position-referenced terrain information based on measurements from an on-board ranging sensor, and previously identified position-referenced terrain information from the terrain database.

2. The method set forth in claim 1 wherein the determining in b) is performed when a value for a parameter associated with a current position of the flying craft is in a first logical relation to a predetermined threshold value, the method further including:
   c) repetitively determining the corrected position of the flying craft during the precision approach based at least in part on attitude and velocity information from the inertial navigation system when the value for the parameter associated with the current position of the flying craft is in a second logical relation to the predetermined threshold value;
   wherein the predetermined threshold value is between parameter values in first logical relation and parameter values in second logical relation.

3. The method set forth in claim 2 wherein the determining in c) is also based at least in part on position information from an onboard radio receiver associated with a radio navigation system.

4. The method set forth in claim 3 wherein the radio navigation system includes a global positioning system (GPS) navigation system and the onboard radio receiver includes a GPS receiver.

5. The method set forth in claim 4 wherein the position information from the onboard radio receiver includes GPS carrier phase information and the determining in c) includes use of the GPS carrier phase information to compensate for drift error associated with the inertial navigation system.

6. The method set forth in claim 4 wherein the radio navigation system includes a wide area augmentation system (WAAS) and the onboard radio receiver includes a WAAS receiver.

7. The method set forth in claim 6 wherein the position information from the onboard radio receiver includes WAAS position information and the determining in c) includes use of the WAAS position information to compensate for position error associated with the GPS navigation system and to further compensate for drift error associated with the inertial navigation system.

8. The method set forth in claim 2 wherein the parameter associated with the current position of the flying craft is height above a ground level associated with the landing site and the determining in c) is performed when the parameter value is greater than the predetermined threshold value.

9. The method set forth in claim 1 wherein the terrain database includes a three-dimensional (3-D) terrain model associated with the landing site formed by a plurality of previously identified points and the onboard ranging sensor is configured to scan a terrain surface area associated with the current position of the flying craft to provide the measurements used to form the current position-referenced terrain information.

10. The method set forth in claim 9, each iteration of determining the corrected position in b) further including:
c) identifying an initial position of the flying craft based at least in part on attitude and velocity information from the inertial navigation system;
d) relating the initial position to an initial previously identified point from the previously identified position-referenced terrain information in the terrain database and to an initial currently identified point of the current position-referenced terrain information based on measurements from the onboard ranging sensor;
e) performing a gradient-based search technique for a minimum mean of the square error agreement metric to adjust one of the previously identified position-referenced terrain information and current position-referenced terrain information in relation to each other to identify an acceptable match between the current position-referenced terrain information and the terrain database and to estimate a corresponding position error; and
f) adjusting the corrected position to compensate for the estimated position error.

11. A precision approach guidance system that provides flying craft guidance information during a precision approach to a landing site, the system including:
an inertial navigation system;
an onboard ranging sensor;
a terrain database storing previously identified position-referenced terrain information associated with the landing site, wherein terrain information includes elevation values; and
a position determining process in communication with the inertial navigation system, onboard ranging sensor, and terrain database;
wherein the position determining process repetitively determines a corrected position of the flying craft during the precision approach based at least in part on attitude and velocity information from the inertial navigation system, current position-referenced terrain information based on measurements from the onboard ranging sensor, and previously identified position-referenced terrain information from the terrain database.

12. The system set forth in claim 11 wherein corrected positions of the flying craft that are based at least in part on attitude and velocity information from an inertial navigation system, current position-referenced terrain information based on measurements from the onboard ranging sensor, and previously identified position-referenced terrain information from the terrain database are determined when a value for a parameter associated with a current position of the flying craft is in a first logical relation to a predetermined threshold value; and
wherein the position determining process repetitively determines the corrected position of the flying craft during the precision approach based at least in part on attitude and velocity information from the inertial navigation system when the value for the parameter associated with the current position of the flying craft is in a second logical relation to the predetermined threshold value;
wherein the predetermined threshold value is between parameter values in first logical relation and parameter values in second logical relation.

13. The system set forth in claim 12, further including:
an onboard radio receiver associated with a radio navigation system;
wherein corrected positions of the flying craft determined by the position determining process when the value for the parameter associated with the current position of the flying craft is in the second logical relation to the predetermined threshold value are also based at least in part on position information from the onboard radio receiver.

14. The system set forth in claim 13 wherein the radio navigation system includes a global positioning system (GPS) navigation system and the onboard radio receiver includes a GPS receiver.

15. The system set forth in claim 14 wherein the radio navigation system includes a wide area augmentation system (WAAS) and the onboard radio receiver includes a WAAS receiver.

16. The system set forth in claim 12 wherein the parameter associated with the current position of the flying craft is height above a ground level associated with the landing site and parameter values in second logical relation to the predetermined threshold value are greater than the predetermined threshold value.

17. The system set forth in claim 11 wherein the onboard ranging sensor includes an onboard laser scanner.

18. The system set forth in claim 11 wherein the terrain database includes a three-dimensional (3-D) terrain model associated with the landing site formed by a plurality of previously identified points and the onboard ranging sensor is configured to scan a terrain surface area associated with the current position of the flying craft to provide the measurements used to form the current position-referenced terrain information.

19. The system set forth in claim 11 wherein the flying craft is an aircraft.

20. The system set forth in claim 11 wherein the flying craft is a spacecraft.

21. A precision approach guidance system that provides flying craft guidance information during a precision approach to a landing site, the system including:
an inertial navigation system;
an onboard ranging sensor;
a terrain database storing previously identified position-referenced terrain information associated with the landing site, wherein terrain information includes elevation values; and
first means for repetitively determining a corrected position of the flying craft during the precision approach based at least in part on attitude and velocity information from the inertial navigation system, current position-referenced terrain information based on measurements from the onboard ranging sensor, and previously identified position-referenced terrain information from the terrain database.

22. The system set forth in claim 21 wherein the first means for repetitively determining corrected positions of the flying craft is active when a value for a parameter associated with a current position of the flying craft is in a first logical relation to a predetermined threshold value, the system further including:

second means for repetitively determining the corrected position of the flying craft during the precision approach based at least in part on attitude and velocity information from the inertial navigation system when the value for the parameter associated with the current position of the flying craft is in a second logical relation to the predetermined threshold value;

wherein the predetermined threshold value is between parameter values in first logical relation and parameter values in second logical relation.

23. The system set forth in claim 22, further including:

an onboard radio receiver associated with a radio navigation system;

wherein the second means for repetitively determining the corrected position of the flying craft is also based at least in part on position information from the onboard radio receiver.

24. The system set forth in claim 23 wherein the radio navigation system includes a global positioning system (GPS) navigation system and the onboard radio receiver includes a GPS receiver.

25. The system set forth in claim 24 wherein the radio navigation system includes a wide area augmentation system (WAAS) and the onboard radio receiver includes a WAAS receiver.

26. The system set forth in claim 22 wherein the parameter associated with the current position of the flying craft is height above a ground level associated with the landing site and parameter values in second logical relation to the predetermined threshold value are greater than the predetermined threshold value.

27. The system set forth in claim 21 wherein the onboard ranging sensor includes an onboard laser scanner.

28. The system set forth in claim 21 wherein the terrain database includes a three-dimensional (3-D) terrain model associated with the landing site formed by a plurality of previously identified points and the onboard ranging sensor is configured to scan a terrain surface area associated with the current position of the flying craft to provide the measurements used to form the current position-referenced terrain information.

* * * * *